US011895371B1

(12) United States Patent
Aggarwal et al.

(10) Patent No.: US 11,895,371 B1
(45) Date of Patent: Feb. 6, 2024

(54) MEDIA CONTENT SEGMENT GENERATION AND PRESENTATION

(71) Applicant: Amazon Technologies, Inc., Seattle, WA (US)

(72) Inventors: Abhinav Aggarwal, New Delhi (IN); Yash Pandya, Navi Mumbai (IN); Manivel Sethu, Bangalore Karnataka (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/480,813

(22) Filed: Sep. 21, 2021

(51) Int. Cl.
*H04N 21/845* (2011.01)
*H04N 21/278* (2011.01)
*H04N 21/4725* (2011.01)
*H04N 21/8545* (2011.01)
*H04N 21/488* (2011.01)
*H04N 21/442* (2011.01)

(52) U.S. Cl.
CPC ....... *H04N 21/4725* (2013.01); *H04N 21/278* (2013.01); *H04N 21/44204* (2013.01); *H04N 21/44213* (2013.01); *H04N 21/4884* (2013.01); *H04N 21/845* (2013.01); *H04N 21/8545* (2013.01)

(58) Field of Classification Search
None
See application file for complete search history.

(56) References Cited

U.S. PATENT DOCUMENTS

| | | | | |
|---|---|---|---|---|
| 7,827,125 | B1 * | 11/2010 | Rennison | G06F 16/906 706/14 |
| 8,005,724 | B2 * | 8/2011 | Dunning | G06Q 30/0269 705/26.7 |
| 8,260,108 | B2 * | 9/2012 | Murakoshi | H04N 21/8456 386/200 |
| 9,176,658 | B1 * | 11/2015 | Latin-Stoermer | G06F 3/04847 |
| 9,253,533 | B1 * | 2/2016 | Morgan | H04N 21/44222 |
| 9,256,889 | B1 * | 2/2016 | Yun | G06F 40/169 |
| 9,323,721 | B1 * | 4/2016 | Banerjee | G06F 40/289 |
| 9,396,180 | B1 * | 7/2016 | Salvador | H04N 21/26603 |
| 9,558,784 | B1 * | 1/2017 | Gray | H04N 5/783 |
| 10,555,023 | B1 * | 2/2020 | McCarthy | H04N 21/8549 |
| 10,678,854 | B1 * | 6/2020 | Carlson | G06F 16/7834 |
| 10,901,762 | B1 * | 1/2021 | Kuklinski | H04N 21/4788 |

(Continued)

FOREIGN PATENT DOCUMENTS

WO WO-2017124116 A1 * 7/2017

OTHER PUBLICATIONS

Ghosal, Gargi. "What is Frinkiac? Everything You Need to Know About the Search Engine for The Simpsons". Aug. 12, 2021. <retrieved from Internet, Oct. 17, 2022> (Year: 2021).*

*Primary Examiner* — William J Kim

(74) *Attorney, Agent, or Firm* — Lee & Hayes P.C.

(57) ABSTRACT

A system can be utilized to determine media clips for media content based on a comparison between subtitles of the media content and information associated with a third-party system. The comparisons can be utilized to identify subtitles based on the comparison and determine the media clips based on portions of the media content associated with the identified subtitles. A smoothing algorithm can be applied to the media clips to modify start times and end times of the media clips. The system can cause the media clips or the corresponding media content to be output by an external device.

20 Claims, 6 Drawing Sheets

(56) References Cited

U.S. PATENT DOCUMENTS

| | | | | |
|---|---|---|---|---|
| 2003/0059200 A1* | 3/2003 | Cuijpers | H04N 21/4888 | 386/245 |
| 2003/0093790 A1* | 5/2003 | Logan | H04N 21/6125 | 348/E7.071 |
| 2003/0229537 A1* | 12/2003 | Dunning | G06Q 30/0269 | 705/26.7 |
| 2004/0261027 A1* | 12/2004 | Dillon | H04N 21/278 | 707/E17.116 |
| 2007/0168543 A1* | 7/2007 | Krikorian | H04N 21/4788 | 709/231 |
| 2007/0188657 A1* | 8/2007 | Basson | H04N 21/43076 | 704/E21.02 |
| 2007/0248334 A1* | 10/2007 | Murakoshi | H04N 21/4147 | 386/326 |
| 2008/0284910 A1* | 11/2008 | Erskine | H04N 5/9206 | 348/E7.001 |
| 2009/0070673 A1* | 3/2009 | Barkan | H04N 21/25891 | 715/716 |
| 2010/0229078 A1* | 9/2010 | Otsubo | H04N 21/4884 | 715/203 |
| 2010/0251305 A1* | 9/2010 | Kimble | H04N 21/466 | 725/46 |
| 2011/0135278 A1* | 6/2011 | Klappert | G06F 40/169 | 715/764 |
| 2012/0150907 A1* | 6/2012 | Chowdhury | H04N 21/8549 | 707/769 |
| 2013/0067333 A1* | 3/2013 | Brenneman | G11B 27/105 | 715/721 |
| 2015/0086173 A1* | 3/2015 | Abecassis | H04N 21/858 | 386/201 |
| 2017/0072301 A1* | 3/2017 | Abecassis | A63F 9/183 | |
| 2018/0226071 A1* | 8/2018 | Winter | G06F 40/35 | |
| 2019/0297365 A1* | 9/2019 | Gupta | H04N 21/251 | |
| 2020/0195983 A1* | 6/2020 | Chao | G06F 16/7328 | |
| 2020/0196028 A1* | 6/2020 | Kuehne, Jr. | H04N 21/8547 | |
| 2020/0213680 A1* | 7/2020 | Ingel | G10L 13/00 | |
| 2021/0026624 A1* | 1/2021 | Me | G06F 9/451 | |

* cited by examiner

MEDIA CONTENT SEGMENT GENERATION AND PRESENTATION

BACKGROUND

Service providers provide various types of media content, such as movies or television (TV) shows, that are made available for viewing by consumers. The service providers also provide access to information, such as media content descriptions, advertisement content, user reviews, critic reviews, studio generated media content, manually generated media content segments, and descriptions about various aspects associated with the media content, such as actors captured in the media content and crew members that contribute to generation of the media content. Manually generating each of the media content segments requires selecting content from among a vast assortment of media content that is provided by the service providers, viewing and analyzing the selected content, cutting the selected content into smaller content portions, and splicing a number of the content portions to create the corresponding media content segment. Accordingly, generation of the media content segments requires an inordinate amount of resources, time, costs, computing resources, and so on.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
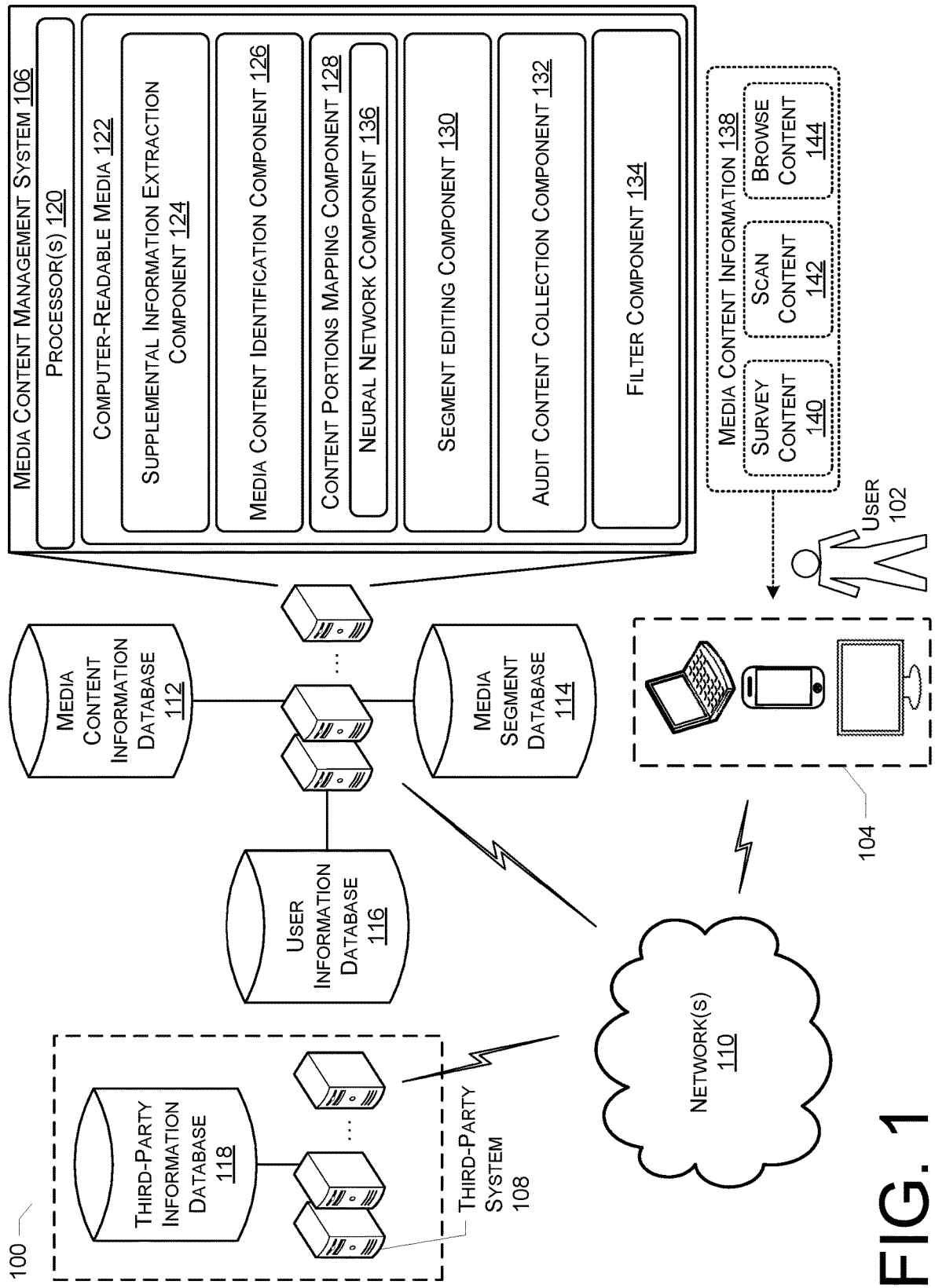
FIG. 1 illustrates a schematic diagram of an example environment for analyzing and modifying media content included in media content information and displaying media segments associated with the media content.

The systems and processes described herein facilitate the generation of catalogs of media clips based on media content that is accessible to users. The media clips can be generated based on relationships between media content and supplemental information, such as third-party information, manually determined audio information, and/or manually determined video information. Catalogs can be implemented, populated, updated, and/or accessed to provide media content information to display devices. In some examples, the media content information can include media clips, media clip related information, media content, and/or media content related information. The display devices can execute applications that control display devices to retrieve information from the catalogs. Catalog information can be managed and utilized by the applications based on different modes of the applications.

Segments of individual ones of a plurality of portions of media content of any type (e.g., (e.g., a movie, a TV show, a documentary, etc.) can be determined as media clips based on information of various types. The various types of information utilized can be received from different sources. In some examples, the sources can include a media content information database, a user information database, and/or a third-party information database. The media content information database can include media content information, which can include media content of various types, such as movies, television (TV) shows, or other types of films. The media content information can include media content related information, such as various types of information associated with media content. The user information database can include user account information, user input information, user history information, user feedback information, or other types of user related information associated with users that access the media content database. The third-party information database can include third-party information obtainable from a third-party system. The third-party information can include information associated with the media content information, such as third-party content (e.g., user determined quotes associated with media content, user provided trivia about media content, user identified media content errors, reviews from users, and other types of related information).

The media clips can be determined based on relationships that are identified and/or established by a trained machine learning (ML) model. The relationships can be identified based on comparisons between portions of the media content and other information (e.g., supplemental information, such as third-party information, manually determined audio information, and/or manually determined video information). Audio content, video content, and/or transcripts utilized for the comparisons can be extracted from any of the portions of the media content. In some examples, the audio content can be utilized to generate the transcripts. The comparisons can be performed to determine common characteristics of a segment of a portion of the media content and the supplemental information. The relationships can indicate the segment and the supplemental information having the common characteristics. In some examples, the ML model can determine a relationship based on the supplemental information (e.g., third-party information (e.g., a transcript and a plurality of quotes), manually determined audio information, and/or manually determined video information) that are input to the ML model. The ML model can output information associated with the relationship, based on the segment of the portion of the media content having one or more characteristics in common with one or more characteristics of the supplemental information. The segment can be determined as a media clip. The media clip can be edited, such as by enhancing, auditing, and/or filtering data associated with the media clip.

Applications can access and retrieve information stored in catalogs and control display devices to perform operations based on the retrieved catalog information. The applications can control the display devices to transmit requests to databases that store the catalogs. The requests can be utilized to obtain different sections of the catalog information from the databases based on different types of application modes. The applications can determine the application modes utilized to operate the display devices based on input provided by users via the display devices. The application modes can include a mode to cause the display devices to present media clips, a mode to cause the display devices to present media clips associated with unviewed media content, and a mode to cause the display devices to present media clips associated with viewed media content. The applications can be utilized by the display devices to receive and display the media clips based on requests associated with input provided by the users.

Currently, determinations of media clips require manual teams to receive and analyze media content utilized to generate the media clips. Generation of each of the media clips requires significant manual effort by the teams to determine, extract, and assemble the segments of the media content into the media clips. A total amount of media content that exists and is available to be utilized for generation of media clips is extremely large and is continually increasing. The vast amounts of time, knowledge, and costs that would be required to manually generate media clips for the available media content is enormous. Additionally, selection of the segments of the media content for generating the media clips requires subjective determinations by members of media content management teams. Analyses made by the team members that contribute to the subjective determinations is limited by the knowledge of the team members regarding likelihoods that users will view the segments of the media content. Accordingly, substantially and/or partially automated techniques for determining media clips can enable media clips and media clip related information to be utilized by display devices without unnecessarily consuming media content management resources.

Furthermore, the techniques described herein provide various technical advantages for determining, managing, and utilizing media content information. For instance, system resources utilized by team members contributing to generation of media clips can be significantly decreased. The system resources can be reallocated for other purposes such as utilization for other media content associated functions, or functions associated with other types of content and/or services. In some instances, network bandwidth that is available as a result of automated determinations of media clips that can be utilized by display devices is able to be conserved and/or repurposed. The amount of network throughput for transmission of media content information with media clips determined via the automated techniques described herein can be decreased in comparison to manual media clip determination techniques. The amount of network throughput can be decreased as a result of automated media content determination techniques due to sizes of transmissions of media content information being decreased.

That is, network communications for media content information that does include media clips determined via the automated techniques described herein often include larger sections of the media content. The larger sections of the media content are required to be transmitted as a result of media clips not being available for media content in many circumstances. In those circumstances, display devices must receive the larger sections of the media content to enable the users to search for, and view, desired sections of the media content. Accordingly, the automated media clip determination techniques described herein can decrease network throughput due to the media clips, in lieu of larger sections of the media content, being transmitted to the display devices.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

FIG. 1 illustrates a schematic diagram of an example environment 100 for analyzing and modifying media content included in media content information and displaying media segments associated with the media content.

As shown in FIG. 1, the environment 100 can include a media content management system 106 that manages media content information, and a third-party system 108 that manages third-party information. The media content management system 106 and/or the third-party information system 108 can receive the request(s) from a display device 104, via one or more network(s) 110. The media content management system 106 and/or the third-party information system 108 can transmit the response(s) to the display device 104, via the one or more networks 110. In some examples, individual ones of the response(s) can be transmitted based on the corresponding request(s). However, the current disclosure is not limited as such; and, for example, any number of request(s), as discussed herein, can be received and utilized to process, individually or in combination, any number of response(s).

The media content management system 106 can be communicatively coupled to one or more databases, such as a media content information database 112, a media segment database 114, and a user information database 116. In some examples, the media content management system 106 can be connected (e.g., directly connected) to the media content information database 112, the media segment database 114, and/or the user information database 116. However, the current disclosure is not limited as such; and, for example, the media content management system 106 can be coupled, via the network(s) 110, to one or more of the media content information database 112, the media segment database 114, and the user information database 116.

Generally, the environment 100 can include any type of physical location in which a user 102 interacts with various devices, such as the display device 104. As shown, the user 102 would like to control, or receive information from, the display device 104 by providing input to the display device 104. The display device 104 can be controlled based on input provided via one or more input/output (I/O) interfaces (e.g., I/O interface(s) 518 as discussed below, with reference to FIG. 5), such as a user interface (e.g., a haptic output device), a remote control, and/or a microphone. One or more display devices (e.g., the display device 104 and/or one or more other display devices implemented in a similar way as the display device 104) can be controlled to transmit one or more requests based on the input.

The request(s) can include one or more requests transmitted to a media content management system 106, one or more requests transmitted to the third-party system 108, etc. The request(s) that are transmitted to the media content management system 106 can include one or more requests to provide media content information and/or supplemental information (e.g., manually determined audio information and/or manually determined video information). The media content information can include one or more media content(s) of various types, and media content related information. The media content(s) can include movies, television (TV) shows, or other types of films. The media content related information can include various types of information associated with the media content, such as at least one of a title, a movie picture association (MPA) film rating), a viewing length, one or more film genres, one or more plot summaries, one or more user ratings, one or more critic ratings, one or more cast members, one or more crew members, one or more film studios, one or more awards, one or more soundtrack song names, a release date, one or more countries of origin, one or more languages spoken, one or more filing locations, box office information (e.g., a worldwide gross amount, a domestic gross amount etc.), and/or any other information about the media content.

The request(s) to provide the media content information to the media content management system 106 can include the media content information and can be transmitted by display device(s) (e.g., display device(s) associated with user(s), operator(s) etc. of the media content management system 106). The request(s) including the media content information can be received by the media content management system 106, which can store the received media content information (e.g., the received media content information can be stored in the media content information database 112, discussed below).

The request(s) to provide the supplemental information can include manually determined information, such as manually determined audio information and/or manually determined video information. The manually determined information can include segments of the media content that are determined (e.g., identified) by corresponding user(s) of the display devices(s). The manually determined audio information can include audio segments of the media segments. In some examples, the audio segments can have a same size or a different size. For instance, with examples of audio segments having the same size, the audio segments can include an audio segment with a time span of a first ten second period of the audio segment (e.g., an audio segment that has a time span of 5-10 minutes of the corresponding media content, which can have a time span of 0-120 minutes), an audio segment with second ten second period of the audio segment, etc. The manually determined video information can be implemented in a similar way as the manually determined audio information, except with video segments instead of audio segments. In some examples, the manually determined audio information and/or the manually determined video information can be determined by the media content management system 106, based on input from a user to the media content management system 106.

As a hypothetical example, a user can watch a portion of media content, such as a movie, and identify information as the manually determined information. The user can identify audio information as the manually determined audio information and/or video information as the manually determined video information. To identify the manually determined audio information, the user, while watching, or after watching, all or part of the movie, can input an identifier associated with a sound in the movie. If the sound is a sound of a punch or a sword clash in a fight scene of the movie, the user can input an identifier information (e.g., identifier data) in a user interface program (e.g., a website page, a database form, etc.) associated with the movie. The identifier information can include information associated with the sound, such as one or more of a time in the movie at which the sound occurs, a type (e.g., a punch or a sword clash) of the sound, a category (e.g., fighting) of the sound, one or more characters and/or parts of the movie associated with the sound, and the like.

In the hypothetical example discussed above, the user (e.g., an operator) can identify video information, alternatively or additionally to the audio information. The video information can be identified as the manually determined video information. The user, while watching, or after watching, all or part of the movie, can input an identifier associated with viewable content in the movie. If the viewable content is a hand throwing a punch or a sword moving and clashing with another sword in a fight scene of the movie, the user can input an identifier information (e.g., identifier data) in a user interface program (e.g., a website page, a database form, etc.) associated with the movie. The identifier information can include information associated with the viewable content, such as one or more of a time in the movie at which the viewable content occurs, a type (e.g., a punch or a sword clash) of the viewable content, a category (e.g., an action genre, a comedy genre, a drama genre) of the viewable content, one or more characters and/or parts of the movie associated with the viewable content, and the like. Any of the manually determined video information for the corresponding media segment and/or scene can be utilized along with, or separate from, any of the manually determined audio information. The manually determined information (e.g., the identifier information) can be stored in one or more databases.

The time in the movie at which the viewable content occurs that is included in the identifier information can be a period of time of the audio segments, as discussed above, which can have a same size or a different size. The identifier information can include a number that identifies a segment, based on a plurality of segments being given corresponding and unique numbers by the user interface program. Alternatively or additionally, the identifier information can include time information that identifies the segment, such as corresponding times during the movie at which the segment starts and ends. The user can input identifier information associated with one or more of the segments. The identifier information for any individual segment can include identifier information for each of one or more sounds and/or viewable content in the segment. The identifier information can include more than one category (e.g., a scene can be identified as having a fight/action genre and a drama genre). The segments identified in the manually determined information can have a time span (e.g., 0.5, seconds (s), 1 s, 2 s, 5 s, 10 s, 1 minute (m), 2 m, 5 m, 10 m, etc.) that is the same size or shorter than segments (e.g., combinations of segments) utilized as the media clips. The segments in the manually determined information can be utilized by the ML model to identify other segments of similar or different lengths of other movies. The segments identified by the ML model can be scenes of the corresponding portion of media content, which can have a time span (e.g., 90 m, 110 m, 110 m, 120 m, etc.). The segments identified by the ML model can be used as media clips, or combined with other segments into the media clips, by the media content analysis modules 214.

In the hypothetical example discussed above, the user can interact with a program (e.g., a website page, a database form, etc.) that is designed to map the any of the manually determined information to the movie, and/or the corresponding segment and/or scene of the movie. The program can be utilized to generate a tag for any segment of the movie. The tag can include the manually determined information or be utilized to store the manually determined information along with the tag. The tag can provide a link to access the manually determined information stored in the database(s).

In the hypothetical example discussed above, any of the manually determined information can be input by the user based on the user determining the sound and/or video content is associated with a scene that another user might be interested in watching. Alternatively or additionally, any of the manually determined information can be input by the user based on the user determining that the sound and/or video content is of a type that is likely to occur in other scenes that another user might be interested in watching. The manually determined information can then be utilized to train the ML model to identify the other scenes in the other movies, based on the sounds and/or visual content in the other scenes/movies being similar to the sounds and/or visual content identified in the manually determined information.

In some examples, the manually determined information (e.g., the manually determined audio information and/or the manually determined video information) can be stored in one or more databases (e.g., the media content information database 112, the media segment database 114, and/or the user information database 116) coupled to the media content management system 106. In other examples, the manually determined information (e.g., the manually determined audio information and/or the manually determined video information) can be stored in one or more other manually determined information databases.

Alternatively or additionally, the request(s) transmitted to the media content management system 106 can be utilized by the display device(s) to receive one or more responses with media content information. The media content information received in the response(s) can be stored in, and utilized by, the display device(s) (e.g., the display device(s) associated with user(s), operator(s) etc. of the media content management system 106) from which the request(s) are transmitted.

The request(s) that are transmitted to the third-party system 108 can include one or more requests utilized to provide third-party information to the third-party system 108. The third-party information can include third-party content and third-party related content information. In some examples, the third-party content can include content (e.g., quotes, trivia, user identified media content errors data ("goofs"), manually determined audio information, manually determined video information, etc.) associated with media content. The third-party information can be provided by users of display devices via the network(s) 110, to the third-party system 108.

The request(s) utilized to provide the third-party information to the third-party system 108 can include the third party information and can be transmitted by display device(s) (e.g., display device(s) associated with user(s), operator(s) etc. of the third-party system 108). The request(s) with the third-party information can be received by the third-party system 108, which can store the received third-party information (e.g., the third-party information can be stored in the third-party information database 118, discussed below).

Alternatively or additionally, the request(s) that are transmitted to the third-party system 108 can include one or more requests utilized to receive one or more responses with third-party information. The request(s) can be transmitted by display device(s) (e.g., display device(s) associated with user(s), operator(s) etc. of the third-party system 108). The third-party information received in the response(s) can be stored in, and utilized by, the device(s) (e.g., display device(s) associated with user(s), operator(s) etc. of the third-party system 108) from which the request(s) are transmitted).

Although the request(s) can be transmitted to various systems (e.g., the media content management system 106, the third-party system 108, etc.) by various display devices as discussed above in the current disclosure, it is not limited as such. The request(s) transmitted to the media content management system 106 can be from other types of display devices (e.g., display device(s) associated with user(s), operator(s) etc., of the third-party system 108). The request(s) transmitted to the third-party system 108 can be from other types of display devices (e.g., display device(s) associated with user(s), operator(s), etc., of the media content management system 106). In a similar way, the response(s) received from the various systems (e.g., the media content management system 106, the third-party system 108, etc.) can be received by various types of display devices (e.g., display device(s) associated with user(s), operator(s) etc., of the media content management system 106, display device(s) associated with user(s), operator(s) etc., of the third-party system 108, etc.).

The media content information database 112 and/or the media segment database 114 can store media content information. In some examples, the media content information database 112 can store media content information, such as media content and media content related information. The media content can include any kind of media content, such as a television (TV) show (e.g., an episode of a TV show), a movie, a documentary, etc. Although various features can be implemented utilizing media content as discussed above in this disclosure, it is not limited as such. The term "media content" is used for convenience and simplicity and is interchangeable with any term for any of various types of media content such as a "TV show episode," a "film," a "movie," a "documentary," etc. Any portion of the media content information (e.g., one or more portions of the media content) can be stored in the media content information database 112, as part of one or more catalogs (e.g., a catalog including viewed media content(s), a catalog including unviewed content(s), etc.).

The media content related information can include various types of information about the media content, such as at least one of a title, a movie picture association (MPA) film rating), a viewing length, one or more film genres, one or more plot summaries, one or more user ratings, one or more critic ratings, one or more cast members, one or more crew members, one or more film studios, one or more awards, one or more soundtrack song names, a release date, one or more countries of origin, one or more languages spoken, one or more filing locations, box office information (e.g., a worldwide gross amount, a domestic gross amount etc.), and/or any other information about the media content.

In some examples, the media content and media content related information can be stored in a media file. In other examples, the media content can be stored in a file (e.g., a first file); and media content related information can be stored in a file (e.g., a second file), or in one or more files (e.g., one or more second files). In those examples, individual ones of the various types of information in the media content related information can be stored in one or more of the second file(s).

In some examples, the media segment database 114 can store media content information, such as media segments (e.g., media clips or a combination of segments of a portion of media content, such as one or more scenes in a movie) and media segment related information. However, the current disclosure is not limited as such; and, in some examples, any of the information stored in the media content information database 112, as discussed herein, can be stored, alternatively or additionally, in the media segment database 114. In those or other examples, any of the information stored in the media segment database 114, as discussed herein, can be stored, alternatively or additionally, in the media content information database 112. Any part (e.g., one or more media segments and/or one or more portions of the media content) of the media content information can be stored in the media segment database 114, as part of one or more catalogs (e.g., a catalog including media segment(s) associated with the viewed media content(s) and/or the viewed media content(s), a catalog including media segment(s) associated with the unviewed media content(s) and/or the unviewed content(s), etc.).

The user information database 116 can store user content, such as content associated with one or more users, with individual ones of the user(s) being associated with the corresponding display devices 104. However, the current disclosure is not limited as such; and, for example, any number of users can be associated with any number of the display devices 104. The user content stored in the user information database 116 can include user related information of the users, such as user account information, biographical information, media content viewing history information, and usage history associated with one or more other systems (e.g., a system associated with an on-line purchase and/or mail-order website, a system associated with a website for a brick-and mortar store, etc.) that are accessible by, and/or communicatively coupled to, the media content management system 106. The media content management system 106 can receive the user content and transmit the user content to the user information database 116, which can store the user content.

The third-party system 108 can be communicatively coupled to one or more databases, such as a third-party content database 118. In some examples, the third-party system 108 can be connected (e.g., directly connected) to one or more databases, such as the third-party content database 118. However, the current disclosure is not limited as such; and, for example, the third-party system 108 can be coupled, via the network(s) 110, to one or more databases, such as the third-party content database 118.

The third-party content database 118 can store the third-party information, which can include the third-party content and the third-party related content information. The third-party system 108 can receive the third-party content and transmit the third-party content to the third-party content database 118, which can store the third-party content.

As a hypothetical example, a display device (e.g., the display device 104 or one of the other display device(s)) (e.g., a third-party affiliated operator display device associated with the third-party system 108) can transmit a request (e.g., a third-party request)) to the third-party system to add (e.g., provide) third-party content (e.g., a quote "You can't handle the truth!") associated with media content (e.g., a movie (e.g., "A Few Good Men") to the third-party database 118. Additionally, a display device (e.g., the display device 104 or one of the other display device(s)) (e.g., an operator display device associated with the media content management system 106) can transmit a request (e.g., an operator request) to the media content management system 106 to provide (e.g., add) the media content (e.g., the movie with which the quote is associated) to the media content information database 112.

As part of the hypothetical example, one or more of the operator requests, and/or one or more other operator requests, can include the movie and/or media content related information (e.g., movie related information (e.g., the title of the movie, subtitles (e.g., texts), etc.)) associated with the movie. The movie and/or the movie related information can include the subtitles. The subtitles can be included in a media file along with the movie, or as a separate file (e.g., a separate file with the subtitles and/or other media related information). The subtitles can be in any language (e.g., English). The subtitles can include one or more versions of texts of various languages that match dialog of the movie and that can be displayed at a portion of a screen during playback of the movie.

As part of the hypothetical example, one or more requests can be transmitted to the media content management system 106 and utilized by the display device(s) (e.g., the display device(s) associated with user(s), operator(s) etc. of the media content management system 106) to receive one or more responses with media content information (e.g., one or more media clips associated with the movie "A Few Good Men," the movie, the subtitles (e.g., texts), etc.). In a case in which the media clip(s) are received, the media clip(s) and some of the movie subtitles (e.g., a subtitle clip that is extracted based on the movie subtitles for a media clip, the subtitle clip being associated with the corresponding media clip) can be stored by the display device(s) from which the request(s) are transmitted. The media clip(s) based on the movie subtitles can be received as part of, or separate from, corresponding file(s) that include the corresponding media clip. The media clip(s) (e.g., video associated with the media clip(s)) can be performed (e.g., output, streamed and played, and/or downloaded and played) by the display device(s). Individual media clip(s) of the movie subtitles can be output while the corresponding media clip(s) are being performed.

In a case in which the movie is received, the movie and the movie subtitles can be stored by the display device(s) from which the request(s) are transmitted. The movie subtitles can be received as part of or separate from the file that includes the corresponding movie. The movie (e.g., video associated with the movie) can be performed (e.g., output, streamed and played, and/or downloaded and played) by the display device(s). The movie subtitles can be output while the movie is being performed. The user(s) of the display device(s) can determine, based on the media clip(s) performed by the display device(s), whether to provide input for transmission of request(s) to perform the movie. If the user(s) enjoy the media clip(s), the user(s) can provide input to the display device(s) to transmit the request(s) to perform the movie.

The user(s) can provide input for transmission of request(s) for performance of the media clip(s), based on an amount of available time that the user(s) have being long enough for performance of part or all of a media clip but not long enough for performance of the corresponding movie. The user(s) can provide input for transmission of request(s) for performance of the media clip(s) based on an amount of available time being long enough for performance of the corresponding movie, such as if the user(s) prefers to view the media clip(s) instead of the movie.

Information associated with the media clip(s) (e.g., the media clips associated with the input from the user(s)) can be provided to the user(s) via the display device(s) (e.g., presented as an advertisement link or suggestion link on a website presented to the user(s)). The advertisement link and/or suggestion link can be presented via the website based on the media content management system 106 determining the website is being accessed by the user(s) (e.g., determining based on information received from the display device(s) when the user downloads website content). The advertisement link and/or suggestion link can be presented based on user history indicating a likelihood that the user(s) will request performance of the media clip(s) or movie (e.g., the user history indicating the user(s) previously viewed the media clip(s) or movie(s), previously viewed similar media clip(s) or movie(s), or previously viewed related content (e.g., descriptions, studio preview, etc.) associated with the media clip(s) or movie(s) or any similar media clip(s) or movie(s)). The advertisement link or suggestion link can be presented based on information associated with one or more other users, such as information indicating other user(s) (e.g., other user(s) that have a history of watching the media clip(s) or movie(s) or any similar media clip(s) or movie(s) as the user(s)) requested presentation of the media clip(s) or move(s) associated with the advertisement link and/or suggestion link that is presented to the user(s).

In some examples, the user(s) can provide input for transmission of request(s) for performance of the media clip(s) based on the user(s) having an interest to watch the media clip(s). The user(s) can provide input for transmission of request(s) for performance of the media clip(s), and provide input for transmission of request(s) (e.g., request(s) received and/or processed by the media content management system 106, the third party system 108, one or more other systems, etc.) to share the corresponding media clip(s), or other media clip(s) associated with the corresponding movie, with one or more other users. In a similar way, the user(s) can provide input for transmission of request(s) to share the corresponding movie(s) with other user(s). The media clip(s) or the movie(s) can be shared with the other user(s) via information (e.g., advertisement link(s) or suggestion link(s)) associated with the media clip(s) or the movie(s) being posted to on-line applications, web browsers, etc. (e.g., integrated within content (e.g., internet content) determined to be associated with other user account(s) of the other user(s), content transmitted to other display device(s) associated with the other user(s), etc.).

The media content management system 106 can generally refer to a network-accessible platform—or "cloud-based service"—implemented as a computing infrastructure of processors, storage, software, data access, and so forth that is maintained and accessible via the network(s) 110, such as the Internet and/or a cellular network. The media content management system 106 can be implemented as one or more computing devices including one or more servers, desktop computers, laptop computers, or the like. In one example, the media content management system 106 can be configured in a server cluster, server farm, data center, mainframe, cloud computing environment, or a combination thereof. To illustrate, the media content management system 106 can include any number of devices that operate as a distributed computing resource (e.g., cloud computing, hosted computing, etc.) that provides services, such as storage, computing, networking, and so on. Thus, the media content management system 106 can generally be implemented as network-accessible resources. These resources include one or more processors 120 and computer-readable storage media 122 executable on the processor(s) 120.

The computer-readable media 122 can store various components, such as a supplemental information extraction component 124, a media content identification component 126, a content portions mapping component 128, a segment editing component 130, an audit content collection component 132, and a filter component 134.

The media content management system 106 can utilize the supplemental information extraction component 124 to extract supplemental information, such as the manually determined information (e.g., manually determined audio information and/or manually determined video information). In some examples, the supplemental information extraction component 124 can be utilized to extract third-party information provided by the third-party system 108, via the network(s) 110. The third-party information can include third-party content (e.g., user determined quotes associated with media content (also referred to herein as a "portion of media content"), user provided trivia (e.g., trivia data) about media content, user identified media content errors, reviews from users), other types of third-party content related information (e.g., third-party content related information associated with the third-party content), and the like.

In some examples, the supplemental information extraction component 124 can be utilized to determine the third-party information (e.g., the third-party content) available via the network(s) 110 (e.g., via the Internet). In those examples, the third-party content that is extracted can include user determined quotes associated with media content, user provided trivia about media content, user identified media content errors, reviews from users, and other types of related information. By way of example, the third-party content (e.g., the user determined quotes) can include quotes associated with media content that are transmitted by display devices (e.g., the display device 104 and/or display devices similar to the display device 104) to the third-party system 108 to be displayed (e.g., displayed via web browsers, display device applications, etc.) by the display devices (e.g., the display device 104 and/or display devices similar to the display device 104).

In some examples, the quotes that are extracted from the third-party system 108 can include a group of the available quotes associated with a portion of the media content. In those examples, the group can include one or more of the available quotes. In other examples, the group can include all of the available quotes.

In some examples, the third-party content that is extracted can include user provided trivia about media content, user identified media content errors, reviews from users, and other types of third-party related information. Although various features can be implemented utilizing the quotes obtained from the third-party system 108 as discussed throughout this disclosure, it is not limited as such. Any of the features implemented utilizing the quotes as discussed throughout this disclosure can be implemented in a similar way for one or more of any of the third-party content (e.g., one or more of the user determined quotes, the user provided trivia about media content, the user identified media content errors, reviews from users, and the other types of third-party related information).

The supplemental information can include other (e.g., contextual) information about the media content with which the supplemental information is associated. In some examples, the other information in the supplemental information can include one or more of the same types of information as in the media content related information, such as at least one of a title, a movie picture association (MPA) film rating), a viewing length, one or more film genres, one or more plot summaries, one or more user ratings, one or more critic ratings, one or more cast members, one or more crew members, one or more film studios, one or more awards, one or more soundtrack song names, a release date, one or more countries of origin, one or more languages spoken, one or more filing locations, box office information (e.g., a worldwide gross amount, a domestic gross amount etc.), etc. In other examples, the information types of the other information in the supplemental information can include different types of information than in the media content related information. Any of the features implemented for determining (e.g., extracting) any of the supplemental information (e.g., the quotes, the trivia, the errors, the reviews, etc.) as discussed throughout this disclosure can include determining (e.g., extracting) the other information.

Additionally or alternatively to the supplemental information retrieved from the third-party system 108, the other information in the supplemental information can include information (e.g., one or more of any information of the same or different types of information in the other information) obtained from one or more other third-party systems, via the network(s) 110. Any of the features implemented for determining (e.g., extracting) the any of the supplemental information (e.g., the quotes, the trivia, the errors, the reviews, etc.) as discussed throughout this disclosure can include determining (e.g., extracting) the other information, which can include the information obtained from the other third-party system(s).

The media content management system 106 can utilize the media content identification component 126 to determine a media content identifier (e.g., a title of the media content) with which the supplemental information (e.g., the third-party information) is associated. A media content identifier (e.g., a title of the media content) in the supplemental information can be mapped with the media content identifier (e.g., the title of the media content) in the media content information (e.g., the media content related information).

In some instances, for example with the media content identifier in the supplemental information not directly matching the media content identifier in the media content related information (e.g., the titles have one or more different spellings of words and/or one or more different words, the titles are in different languages, etc.), the other information in the supplemental information can be mapped to similar types of information in the media content related information. The other information in the supplemental information can be mapped to the similar types of information in the media content related information, additionally or alternatively to the media content identifier in the supplemental information being mapped to the media content identifier in the media content related information. One or more of any of mapping utilizing the media content identifier, mapping utilizing any of the other information, etc., as discussed above, can be utilized to determine the media content identifier in the media content related information that is associated with the third-party content (e.g., the quotes).

In some examples, a likelihood associated with the media content identifier based on the one or more of mapping can be determined by the media content management system 106 utilizing the media content identification component 126. The likelihood being determined to meet or exceed a threshold likelihood can be utilized to determine the media content identifier in the media content related information is associated with the third-party content.

The media content management system 106 can utilize the supplemental information mapping component 128 to determine segments of the media content. In some examples, individual ones of the segments of the media content can be determined to be associated with the corresponding supplemental information (e.g., the third-party information, the manually determined audio information, and/or the manually determined video information). In those examples, the individual ones of the segments of the media content can be determined to be associated with the corresponding supplemental information (e.g., a segment of the media content can be determined to be associated with a corresponding quote).

The content portions mapping component 128 can include a neural network component 136. One or more of the segments of the media content determined utilizing the content portions mapping component 128 can be determined by the media content management system 106, utilizing the neural network component 136. The neural network component 136 can include a deep neural network to operate on the supplemental information and the media content, and to determine the individual ones of the segments of the media content associated with the corresponding supplemental information (e.g., a group of quotes of the third-party content). The neural network component 136 (e.g., the deep neural network of the neural network component 136) can map the individual ones of the supplemental information to the corresponding segments of the media content. The individual ones of the supplemental information can be mapped to the corresponding segments of the media content by utilizing a trained machine learning (ML) model, via the neural network component 136. The trained ML model can utilize fuzzy matching algorithms for the mapping.

In some examples, the ML model can be trained by inputting training data to the ML model. The training data can include a plurality of training media content segments, a plurality of groups of training supplemental information (e.g., third-party content and/or manually determined information (e.g., manually determined audio information and/or manually determined video information)), and a plurality of training relationships that indicate associations between individual ones of the plurality of training media content segments and individual ones of the groups of training supplemental information. By way of example, the training data can include a plurality of groups of training subtitles associated with corresponding groups of training media content segments, a plurality of groups of training quotes, and a plurality of training relationships that indicate associations between individual ones of the training subtitles and individual ones of the training quotes.

The ML model can determine, via the fuzzy matching algorithm, one of the media content segments associated with a corresponding one (e.g., quote) of supplemental information, respectively. The ML model can output the determined media content segment. The determination of the media content segment that is output can include determining, by the ML model, via the fuzzy matching algorithm, a subtitle associated with a corresponding quote. The determined subtitle can be utilized to determine the media content segment that is output. The ML model can output the subtitle, a group of subtitles associated with the subtitle, the media content segment corresponding to the subtitle, the group of the media content segments associated with the media content segment, and/or the portion of the media content that includes the media content segment.

In some instances, for example with mapping performed by the neural network component 136 utilizing quotes received from the third-party content database 118, a plurality of portions of dialog in a plurality of corresponding portions of the media content can be utilized for the mapping. Individual ones of the plurality of portions dialog can be determined to be associated with corresponding portions of the media content in the plurality of portions of the media content (e.g., a portion of dialog can be associated with a movie, a TV show, a documentary, etc.). One or more of the plurality of portions of dialog can be utilized to determine one or more segments in one of the portions of dialog associated with the corresponding supplemental information (e.g., corresponding quotes of the third-party content). Alternatively or additionally, one or more of the plurality of portions of dialog can be utilized to determine one or more segments in one of the portions of dialog associated with corresponding segment(s) in the portion of the media content (e.g., the portion of the media content that includes, and/or is associated with, the portion of the dialog). In some examples, the corresponding segment(s) in the portion of the media content can be determined based on the utilizing of the corresponding supplemental information (e.g., corresponding quotes of the third-party content) to determine the segment(s) in one of the portions of dialog.

In some examples, the portion(s) of dialog can be included in the same media file as the corresponding portions of the media content, or in separate corresponding files. The portion portion(s) of dialog and/or the corresponding portion(s) of the media content can be stored according to any of the above methods with or without other portion(s) of dialog and other portion(s) of the media content. The portion(s) of dialog stored in one or more databases (e.g., the media content information database 112, the media segment database 114, and/or the user information database 116) coupled to the media content management system 106. In other examples, the portion(s) of dialog can be stored in one or more other dialog databases.

In some examples, individual ones of the plurality of portions of dialogs can be included as part of, and/or associated with, the corresponding portions of the media content. The individual ones of the plurality of dialogs can be included in a same media file as the corresponding portions of the media content (e.g., a portion of dialog can be included in a same file as the portion of the media content). The neural network component 136 can determine and output a corresponding segment of the dialog associated with the subtitle determined by the neural network component 136, as discussed above.

As a hypothetical example, an operator request can be transmitted by an operator display device and can include, along with a movie and/or media content related information, dialog associated with the movie. The dialog can include a plurality of dialog segments (e.g., audible utterances) to be output during performance of the movie. A dialog segment (e.g., an audible utterance) can be associated with a corresponding subtitle (e.g., corresponding text). The movie and/or the movie related information can include the dialog. The dialog can be included in a media file along with the movie, or as a separate file (e.g., a separate file that include the dialog and/or other media related information). The dialog can be in any language (e.g., English). One or more versions of dialog of various languages can be included along with the dialog. The movie can be performed (e.g., streamed and played and/or downloaded and played) by a display device (e.g., a user display device (e.g., the display device 104). The dialog can be output while the movie is being performed.

In some examples, mapping can be performed for individual ones of a plurality of portions of media content. The mapping can be performed by utilizing a plurality of subtitle groups associated with corresponding media content of the plurality of portions of media content (e.g., a plurality of subtitle groups associated with dialog in the corresponding media content). Individual subtitle groups (e.g., a subtitle group (e.g., subtitles)) of the plurality of subtitle groups can be associated with corresponding portions of the media content (e.g., a media content). The plurality of subtitle groups can be obtained from the media content information database 112. The subtitle groups can be received (e.g., obtained) from the media content information database 112, via a response to a request indicating the corresponding portions of the media content (e.g., the media content identifiers (e.g., titles) of the media content) that is transmitted by the media content management system 106 (e.g., the media content mapping component) to the media content information database 112).

Although one or more the plurality of subtitle groups can be obtained from the media content information database 112, as discussed above in this disclosure, it is not limited as such. Individual ones of the plurality of transcripts (e.g., a transcript with all groups of subtitles) can be obtained from one or more other databases via the network(s) 110. The other database(s) can be managed by a same service provider as the media content management system 106 or another service provider. Any number of transcripts can be obtained from the same database or one or more different databases.

Mapping can include individual ones (e.g., a quote) of the supplemental information (e.g., third-party content) being mapped to corresponding subtitles (e.g., the corresponding subtitle) of the corresponding subtitle group (e.g., the corresponding subtitle group in the plurality of subtitle groups associated with the corresponding media content portion the plurality of portions of the media content). The mapping can include determining mappable elements (e.g., one or more words, one or more phrases, one or more spellings of words, languages, pronunciation, punctuation, etc.) of the individual ones of the third-party content (e.g., the quote) and mappable elements (e.g., one or more words, one or more phrases, one or more spellings of words, languages, pronunciation, punctuation, etc.) of the corresponding subtitles (e.g., a subtitle) of the corresponding subtitle group. The mapping can further include mapping the mappable elements of the individual ones (e.g., the quote) of the third-party content to the corresponding mappable elements of the corresponding subtitles (e.g., the corresponding subtitle) of the corresponding subtitle group.

In some examples, the mapping can further include mapping the individual ones (e.g., the subtitle) of the subtitles to the corresponding segments of the media content portion, for one or more of any of the plurality of portions of the media content. The individual ones (e.g., the subtitle) of the subtitles can be mapped to the corresponding segments of the portion of the media content, based on the corresponding subtitles (e.g., the corresponding subtitle) to which the individual ones (e.g., the quote) of the third-party content map. The mapping can be utilized to determine the corresponding segments of the media content portion, based on the individual ones of the subtitles.

Although features being mapped are discussed in various portions of this disclosure, it is not limited as such. The terms for any of the features being mapped are used for convenience; and any of the terms utilized for the features being mapped as discussed throughout this disclosure can be interpreted as being textual implementations of the features (e.g., data representing text versions of the features).

By utilizing the neural network component 136 (e.g., the deep neural network of the neural network component 136), the individual ones of the subtitles can be mapped to the corresponding segments of the portion of the media content notwithstanding one or more of the mappable elements of the individual ones of the subtitles being different from one or more of the corresponding mappable elements of the corresponding segments of the portion of the media content.

The individual ones of the subtitles being mapped to the corresponding segments of the portion of the media content based on the mapping between the portions of supplemental information (e.g., third-party content) and the subtitles, can be utilized to determine which segments of the portion of the media content will likely be of interest to users. The segments of the portion of the media content that are determined to likely be of interest to users can be utilized to determined media segments and/or combinations of media segments.

In some examples, the individual ones of the segments of the portion of the media content associated with the corresponding subtitles and/or the corresponding groups of the supplemental information (e.g., third-party content can be determined for all of the groups of the supplemental information (e.g., third-party content (e.g., all of the quotes or groups of quotes)). In other examples, the individual ones of the segments of the portion of the media content associated with the corresponding groups of the supplemental information can be determined for some (e.g., less than all) of the groups of the supplemental information (e.g., less than all of the quotes or groups of quotes). In those examples, one or more of any of the individual ones of the segments of the portion of the media content not determined to be associated with any corresponding groups of the supplemental information can be mapped to corresponding groups of the supplemental information by utilizing the information obtained from other systems, such as systems including the manually determined information, and/or the third-party system(s) (e.g., any of the groups of the third-party content (e.g., quotes) received from the third-party content database 118 via supplemental information extraction component 124 can be replaced by, or substituted with, corresponding groups of the third-party content (e.g., quotes, trivia, user identified media content errors data, etc.) obtained from the other third-party system(s) and utilized for the mapping in the same way as for the groups of the third-party content received from the third-party content database 118).

The media content management system 106 can utilize the segment editing component 130 to enhance (e.g., modify) one or more of the segments of the portion of the media content determined by the media content mapping component 128. In some examples, modifications can include updating (e.g., modifying) start times and/or end times for the segments of the portion of the media content, with one or more individual ones of the start times associated with the corresponding portions of the media content being modified, and/or one or more individual ones of the end times associated with the corresponding segments of the portion of the media content being modified. By way of example, a start time and/or an end time of a segment of the portion of the media content can be modified. By modifying the start time and/or the end time, the segment of the portion of the media content that is displayed can be modified to include a complete portion (e.g., a complete portion of dialog and/or a complete portion of music in the media content) of any audio content in the segment of the portion of the media content and/or a complete portion (e.g., a complete portion of a scene in the media content) of a scene associated with any video content in the portion of the media content. As a result, any abrupt interruptions after a beginning of the portion of audio content or a beginning of the portion of video content, as segment of the portion of the media content is displayed (e.g., performed), can be avoided. Similarly, any abrupt interruptions before an end of the portion of audio content or an end of segment of the portion of video content end can be avoided.

Additionally or alternatively, modifications of the media content portion(s) can include various types of modifications, such as one or more increasing levels or and/or clarity which corresponding portions of dialog associated with the media content segment(s) will be output while the corresponding media content segment(s) are performed (e.g., output) by the display device 104, adding computerized effects to audio (e.g., deepening voices, making voices partially computerized, etc.), increasing visual characteristics (e.g., color balance, color correction (e.g., grading), visual intensity, contrast, resolution, etc.) associated with one or more corresponding sub-portions of the corresponding media content segment(s) that will be output, etc.

In some examples, the segment editing component 130 can be utilized to modify (e.g., enhance) old media clips. In some examples, the segment editing component 130 can be utilized periodically to modify any media clips repeatedly, to continue to improve quality of the media clips.

The media content management system 106 can utilize the audit content collection component 132 to receive input from users (e.g., operators). The input can be received based on the segment(s) of the media content being displayed to the operators via display devices (e.g., display devices similar to the display device 104) of the operators. The input can be received from one or more of the operators, with individual ones of the operators providing input via the corresponding display devices of the users. Information (e.g., audit information) can be associated with the operators(s) auditing one or more of the portion(s) of the media content. By way of example, the audit information can include audit information associated with a segment of the media content. The audit information can indicate a level of quality associated with the segment of the media content. The audit information can indicate whether the segment of the media content is determined to be accessible to be displayed to users, such as the user 102 via the display device 104.

The media content management system 106 can utilize the filter component 134 to indicate the segment of the media content is determined to be accessible to be displayed to the users. The segment of the media content can be determined to be accessible to be displayed to the users based on the audit information including a level of quality that meets or exceeds a threshold level (e.g., an upper threshold level). The audit information including a level of quality that is less than a threshold level (e.g., a lower threshold level) can indicate the segment of the media content is determined to be inaccessible to be displayed. The media content management system 106 can utilize the filter component 134 to block the segment of the media content from being accessible, based on the level of quality being less than the lower threshold level. The segment of the media content can be blocked by deleting the segment and/or setting a flag (e.g., a first flag) associated with the portion. The first flag can be utilized by the media content management system 106 to prevent the segment of the media content from being displayed by one or more of the display devices (e.g., the display device 104). In some examples, the segment of the media content can be prevented from being displayed by one or more of the display devices of the corresponding customers (e.g., consumers), and not prevented from being displayed by one or more of the display devices of the corresponding operators.

In some examples, the upper threshold level can be a same level as the lower threshold level. In other examples, the upper threshold level can be a different level than the lower threshold level. In those examples, the audit information including a level of quality that is less than the upper threshold level and that meets or exceeds the lower threshold level can include a flag (e.g., a second flag) being set. The second flag being set can indicate that further review of the portion of the media content is determined to be required before segment of the media content is accessible to be displayed. The second flag can be utilized by the media content management system 106 to prevent the segment of the media content from being displayed by one or more of the display devices (e.g., the display device 104) of the corresponding customers until the segment of the media content is reviewed by one or more of the operators. Setting of the second flag can be omitted for cases in which the further review of the segment of the media content is not determined to be required.

As a hypothetical example, the media content management system 106 can receive the portion of the media content (e.g., the movie (e.g., "A Few Good Men")), and media content related information (e.g., data indicating a title of the movie) from the media content information database 112. The portion of the media content can be received in a media file along with the media content related information and subtitles, or in a separate media file from one or more media files including one or both of the media content related information and the subtitles. The media file can be utilized by the media content management system 106 to extract the subtitles from the media file.

In the hypothetical example, the media content management system 106 can also receive a plurality of supplemental information from the third-party information database 118. The media content management system 106 can determine, from the plurality of supplemental information, supplemental information that includes quotes from the third-party information database 118. The media content management system 106 can determine the quotes are associated with the movie "A Few Good Men" by comparing the quotes to the subtitles. The comparison can be utilized to determine that the quotes include a quote "You can't handle the truth!," that matches one of the subtitles "You can't handle the truth!" received in the media file. The quote "You can't handle the truth!" can be mapped to the subtitle received in the media file. The movie clip, and a start time and/or an end time of the movie clip, can be determined utilizing a ML model, via a fuzzy matching algorithm.

In the hypothetical example, the media content management system 106 can analyze the subtitle and map the subtitle to the movie, using subtitle text parsing. By mapping the subtitle to the movie, the media content management system 106 can determine a portion of the movie to be utilized as a movie clip. The movie can then be edited (e.g., enhanced via an editing algorithm (e.g., a smoothing algorithm), by modifying a start time and/or end time of the movie clip). The start time can be modified to be earlier if any portion of the scene begins abruptly during a sentence or during a scene in which the character in the movie "A Few Good Men" says the quote "You can't handle the truth!". The start time can be modified to avoid cutting off part of the quote "You can't handle the truth!," or to avoid cutting off part of the question said by another character in the movie, to which the quote "You can't handle the truth!" is said in response. Alternatively, or additionally, the end time can be modified to avoid cutting off the end of the quote, or to avoid cutting away from the scene too early, without showing reactions of other characters in the movie after the characters says the quote. In some embodiments, the start time and the end time associated with the quote can be a predetermined amount of time before and a predetermined amount of time after, respectively, the quote. That way, the scene that includes the quote can included what occurred prior to the quote and what occurred subsequent to the quote, which may allow the viewer to understand the context related to the quote. For instance, by determining that the start time is a certain amount of time prior to the quote, the viewer may understand why that quote is important or significant and, by determining that the end time is a certain amount of time subsequent to an ending of the quote, the viewer may understand characters' reactions to the quote.

In the hypothetical example, the media content management system 106 can manage audits of the movie clip. Operators can review the movie clip to determine whether the start time and/or the end time of the movie clip were appropriately determined. The operators can adjust the start time and/or the end time of the movie clip to ensure the movie clip is smoothly displayable. The media content management system 106 can filter the movie clip by allowing the movie clip to be accessible to users based on the movie clip being associated with a popular or well-known scene of the movie. Other movie clips associated with unimportant or less well-known scenes of the movie can be made inaccessible to display devices. As a result, based on a request from a user to view a movie clip or scene that includes a particular quote, the system may retrieve that movie clip/scene (based on the start time and end time), and present that movie clip/scene to the user via a device (e.g., mobile phone, tablet device, television, etc.) associated with the user.

One or more display devices (e.g., the display device 104) of corresponding users (e.g., the user 102) can be utilized to display one or more portions of media content (e.g., the portion of the media content in the media content information (e.g., media content information 138)) and/or one or more segments of any portion of one or more of any of the media content(s). In some examples, the media content information 138 can include the media content utilized to determine the segment(s) and/or portion(s) of the media content by one or more of the components stored in the computer readable media 122. Alternatively, the media content information 138 can include one or more of any of the segment(s) and/or portion(s) of the media content determined and/or managed by one or more of the components stored in the computer readable media 122. The media content information 138 can include survey content 140, scan content 142, and browse content 144. The segment(s) and/or portion(s) of the media content determined and/or managed by one or more of the components stored in the computer readable media 122 can be included as part of one or more of the survey content 140, the scan content 142, and the browse content 144. The segment(s) of the media content can be included as part of the survey content 140, based on a likelihood of the segment(s) of the media content being requested by the user 102 (e.g., a likelihood of the segment(s) of the media content being indicated in a request received from the display device 104 based on input provided by the user 102 via the display device 104).

In some examples, the survey content 140 can include one or segments of one or more portions of any media content. The survey content 140 can be caused to be displayed by the display device 104 in a survey screen (e.g., the survey screen 402 discussed below with reference to FIG. 4).

In some examples, the scan content 142 can include one or more segments of one or more portions of any media content and/or one or more portions of media contents. The one or more segments of one or more of any portions of media content and/or one or more portions of media content can be included in the scan content 142 based on the segment(s) and/or the portion(s) of media content being unviewed content by the user 102. The scan content 142 can be caused to be displayed by the display device 104 in a scan screen (e.g., the scan screen 406 discussed below with reference to FIG. 4).

In some examples, a segment of a media content can be included in the scan content 142 based on the same segment and/or the corresponding portion of the media content being unviewed content by the user 102. Alternatively or additionally, the portion of media content can be included in the scan content 142 based on any corresponding segment and/or the same portion of media content being unviewed content by the user 102.

In some examples, the browse content 144 can include one or more segments of one or more of any portion of the media content. The one or more segments of one or more of any portion of the media content and/or one or more portion(s) of the media content can be included in the browse content 144 based on the segment(s) and/or the portion(s) of the media content being previously viewed content by the user 102. The browse content 144 can be caused to be displayed by the display device 104 in a browse screen (e.g., the browse screen 410 discussed below with reference to FIG. 4).

In some examples, a segment of a media content can be included in the browse content 144 based on the same segment and/or the corresponding portion of the media content being previously viewed content by the user 102. Alternatively or additionally, a portion of the media content can be included in the browse content 144 based on any corresponding segment and/or the same portion of the media content being previously viewed content by the user 102.

In some examples, any content (e.g., the survey content 140, the scan content 142, and/or the browse content 144) can be included in the corresponding screens based on a relationship identifier. The relationship identifier can be input by the user 102 to the display device 104. The relationship identifier can be one or more of any of various types, such as at least one of a viewing length, a film genre, a plot type, a user rating, a critic rating, a cast member, a crew member, a film studio, an award, a soundtrack song name, a release date, a country of origin, a language spoken, a filing location, box office information (e.g., a worldwide gross amount, a domestic gross amount etc.), and/or any other information about the media content.

As a hypothetical example, the user 102 can input a selection to the display device 104 for one of the screens to show identifiers for movies and/or movie clips based on relationship identifiers. The relationship identifiers can include an actor (e.g., Shah Rukh Khan), a genre (e.g., a musical genre), and/or types of scenes (e.g., dance scenes). The screen can include identifiers for movies and/or movie clips that have Shah Rukh Khan, that are categorized as the musical genre, and that include portions (e.g., partial or entire portions) of dance scenes. The user can scroll through movie identifiers and/or movie clip identifiers that are in a portion of the screen being displayed, movie identifiers and/or movie clip identifiers that are on a portion of the screen not currently displayed, and/or movie identifiers and/or movie clip identifiers that are on a different page of a plurality of pages displayable in the screen. The user 102 can then input a new selection or modification of the selection to add one or more new relationship identifiers and/or to remove one or more of the relationship identifiers. The corresponding screen and/or the page in the screen being displayed can be updated based on the new selection or modification.

The various devices described herein can be configured to send and receive data over various types of networks. For instance, the devices can be configured to send and receive data over wireless wide area networks (WWANs), such as 3G networks, 4G networks, 4G LTE networks, and so forth. While illustrated as being a WAN network 110, the network 110 can alternatively be any other type of network configured to send and receive data between computing devices, such as Personal Area Networks (PANs), Local Area Networks (LANs), Campus Area Networks (CANs), Metropolitan Area Networks (MANs), Broadband Global Area Networks (BGANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. In some examples, the devices can send data over the WAN network 110 using one or more network relay points (e.g., cellular network towers) depending on the distance over which the data must travel. The WAN network 110 can represent an array of wired networks, wireless networks (e.g., WiFi), or combinations thereof. Generally, the display device 104 can be configured to establish any type of connection with the media content management system 106 and/or the third-party system 108. The media content management system 106 can be configured to establish any type of connection with the third-party system 108.

Although the terms "content" and "information" are discussed in various portions of this disclosure, it is not limited as such. The terms "content" and "information" are used for convenience and simplicity and are interchangeable. Although the term "user(s)" is discussed in various portions of this disclosure, it is not limited as such. The term "user(s)" is used for convenience and simplicity and, unless otherwise delineated in particular cases, is interchangeable with "customer(s)," "consumer(s)," "critic(s)," "operator(s)," and "administrator(s)." Although the term "media content" is discussed in various portions of this disclosure, it is not limited as such. Any features associated with the "media content" can be implemented similarly with a "media file" that includes the "media content," or includes both the "media content" and some or all of "media content related information." In some examples, the "media file" can also include a transcript (e.g., a transcript segment group). In other examples, the transcript can be stored separately in another media file.

Although components of the media content management system 106, including the supplemental information extraction component 124, the media content identification component 126, the content portions mapping component 128, the segment editing component 130, the audit content collection component 132, and the filter component 134 can be separate components as discussed above in this disclosure, it is not limited as such. In some examples, one or more of the components can be integrated with one or more of the other components. In some examples, functions performed by any of the components can be performed during a portion (e.g., a partial or entire portion) of time at which functions are performed by any of the other components. Any functions performed by any of the components can be performed on an ongoing basis such to enable the media content management system 106 to update the media segments, determine new media segments, or refrain from utilizing previous determined media segments.

As a hypothetical example, the neural network component 136 can begin to perform operations to map a quote to a portion of a movie, after the segment editing component 130 has begun editing another portion of another movie to which another quote was previously mapped. Or, as another example, the filter component 134 can determine to block a portion of a movie to which a quote was previously mapped while the supplemental information extraction component 124 is determining other quotes that can be subsequently mapped to other movies.

Therefore, and as described herein, resources required for generation of media clips can be decreased by using ML models to automate the generation. Comparisons between supplemental information (e.g., quotes in third-party information) and a portion of media content can be utilized to map the supplemental information to segment(s) in the portion of the media content. In case in which the subtitle information includes quotes, the quotes can be mapped to the subtitles, which can be mapped to a corresponding segment of the portion of the media content, by performing text parsing of the subtitles to determine media clips. The mapping of the quotes and/or the subtitles to the corresponding segment of the portion of the media content can be performed based on fuzzy matching algorithms.

Furthermore, the media clips can be displayed by display devices to reduce network congestion. Users can browse and view the media clips instead of viewing, and scanning through, the media content. The users can view the media clips to determine whether to view the media content. The users can also share the media clips with other users.

Although the term "segment" can be utilized to describe any of the media segments determined by the ML model based on the supplemental information (e.g., the quote) as discussed above in this disclosure, it is not limited as such. The term "segment" as utilized throughout this disclosure with respect to media segments can also refer to "a combination of media segments" that are identified and/or assembled into a media clip (e.g., any of the identified media content segment(s), as discussed below with reference to FIG. 2).

Figure 2:
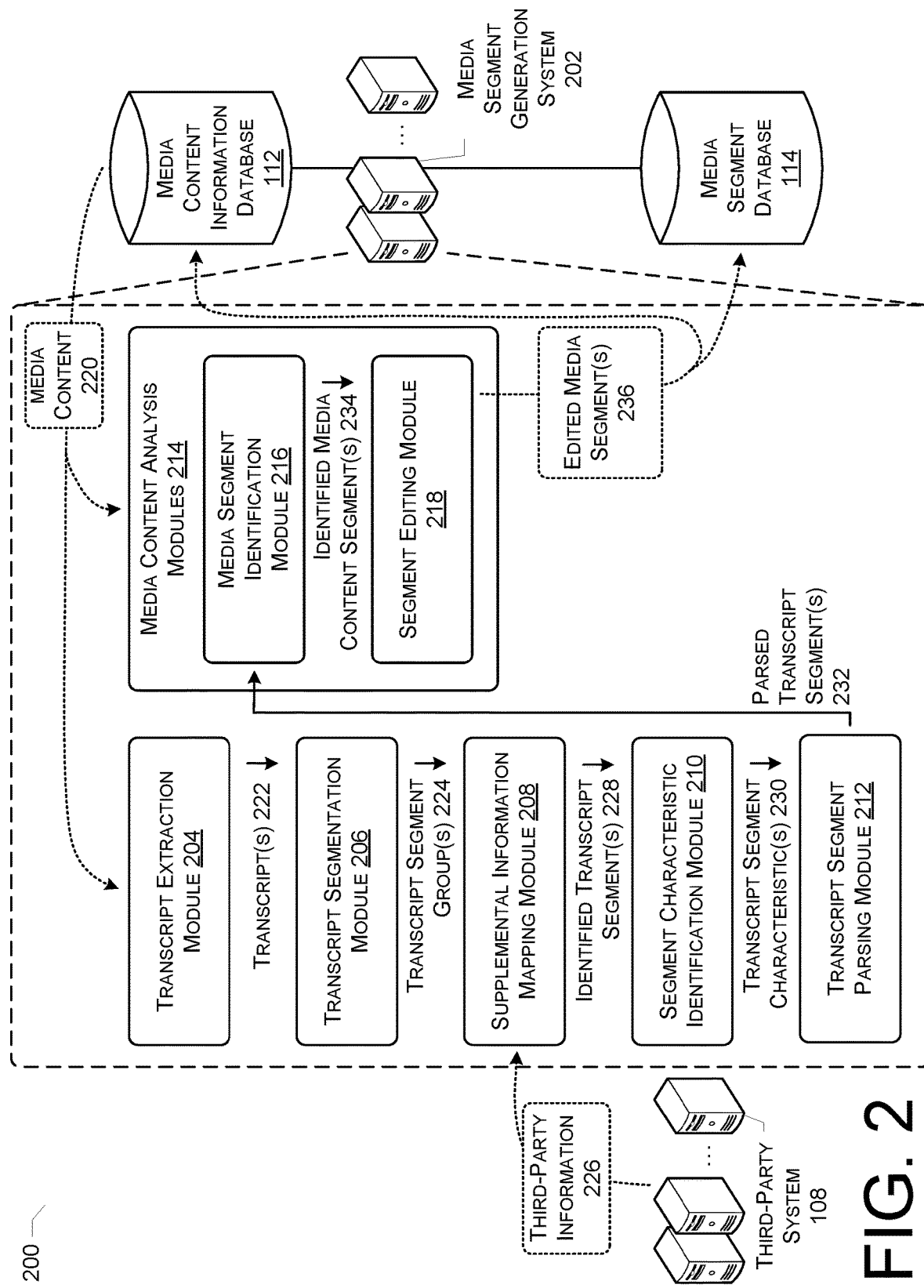
FIG. 2 illustrates a schematic diagram of an example environment for analyzing and modifying media content.

FIG. 2 illustrates a schematic diagram of an example environment 200 for analyzing and modifying media content. In particular, a media segment generation system 202 can be communicatively coupled to one or more databases, such as the media content information database 112, the media segment database 114, and the user information database 116, in a similar way as for the media content management system 106.

The media segment generation system 202 can generally refer to a network-accessible platform, in a similar way as for the media content management system 106, as discussed above with reference to FIG. 1. In some examples, the media segment generation system 202 can be implemented as part of the media content management system 106. In other examples, the media segment generation system 202 can be implemented, in part or as a whole, separately from the media content management system 106. In either of the above discussed examples, one or more of the components in the media content management system 106 can be included in the media segment generation system 202; and, similarly, one or more of the modules in the media segment generation system 202 can be included in the media content management system 106.

The media segment generation system 202 can generally be implemented as network-accessible resources, including one or more processors and computer-readable storage media executable on the processor(s). The computer-readable media can store various modules, such as a transcript extraction module 204, a transcript segmentation module 206, a supplemental information mapping module 208, a segment characteristic(s) identification module 210, a transcript segment parsing module 212, and media content analysis modules 214. The media content analysis modules 214 can include a media segment identification module 216 and a segment editing module 218.

The media segment generation system 202 can utilize the transcript extraction module 204 to receive media content (e.g., media content 220) from the media content information database 112. In some examples, the media content managed by the media content management system 106, as discussed above with reference to FIG. 1 can be implemented as the media content 220.

The media segment generation system 202 can utilize the transcript extraction module 204 to extract a plurality of transcripts from the media content 220. Extracting the plurality of transcripts can include extracting individual ones (e.g., transcript(s) 222) of one or more of the plurality of transcripts from corresponding portions of the media content 220. In some examples, the extraction and/or mapping of the transcripts can be performed in addition, or alternatively to, extraction and/or mapping of dialog by the neural network component 136, as discussed above with reference to FIG. 1.

The media segment generation system 202 can utilize the transcript segmentation module 206 to perform segmentation on one or more (e.g., the transcript(s) 222) of the plurality of transcripts. Segmentation performed on the transcript(s) 222 can include determining one or more transcript segment groups 224 (e.g., a group of transcript segments, also referred to herein as a group of subtitles, which are associated with a movie). Individual ones of one or more subtitle groups (e.g., the group of subtitles associated with the movie) in the plurality of subtitle groups, as discussed above with respect to FIG. 1, can be implemented as corresponding transcript segment group(s) 224 of the plurality of transcript segment groups. Individual ones of the subtitle group(s) in the plurality of subtitle groups, as discussed above with respect to FIG. 1, can be associated with corresponding portions of the media content (e.g., the media content 220).

In some examples, individual ones of the subtitle group(s) can include one or more subtitles, with individual ones of the subtitle(s) being displayable during performing (e.g., displaying via one or more display devices (e.g., the display device 104, as discussed above with reference to FIG. 1)) of a corresponding portion media content. In those examples, for the individual ones of the subtitle(s), an entire section of the subtitle can be displayable at a same span of time (e.g., a time span between two different times). In other examples, one or more partial sections of the subtitle can be displayable at corresponding spans of time. In some instances, in an example in which the subtitle includes one or more of any of various types of groups of text (e.g., one or more phrases, one or more sentences, or one or more paragraphs) in the corresponding transcript 222, an entire section of the subtitle can be displayable via the display device 104 (e.g., one or more sequential frames in the movie content displayable via the display device 104). In other instances, in the same or a similar example, one or more sections of the subtitle can include one or more of any number of sections that are displayable via the display device 104 along with one or more corresponding sequential frames. The subtitle can include a first section (e.g., a first sentence) that is displayable via the display device 104 along with one or more sequential first frames at a first time span (e.g., a time span between a first time and a second time; a second section (e.g., a second sentence) that is displayable via the display device 104 along with one or more sequential second frames a second time span (e.g., a time span between a third time and a fourth time, etc.).

The media segment generation system 202 can be utilized by the media segment generation system 202 to determine individual groups of text of the various types to be included in the corresponding transcript segment in the corresponding transcript segment group 224. In some examples, each group of text of a type (e.g., a phrase, a sentence, a paragraph, etc.) can be determined as a corresponding transcript segment in the corresponding transcript segment group 224 (e.g., each sentence can be determined as the corresponding transcript segment (e.g., a subtitle)).

Alternatively or additionally, individual times at which each group of text of a type (e.g., a phrase, a sentence, a paragraph, etc.) is displayable along with the portion of the media content 220 can be determined. Any of the groups of text (e.g., a current group of text) can be determined as the corresponding transcript segment in the corresponding transcript segment group 224 based on lengths of time between a time at which the current group of text is displayable and times at which adjacent groups of text (e.g., a previous group of text and/or a subsequent group of text) are displayable. Any times at which any text is displayable can be received by the portion of the media content information database 112 along with the corresponding portion of the media content 220 (e.g., in the media content related information). The groups of text can be determined as the corresponding transcript segment in the corresponding transcript segment group 224 based on a length of time between the corresponding time spans associated with the groups of text being displayable.

By way of example, a group of text (e.g., a current group of text) can be determined as a corresponding transcript segment based on a length of time (e.g., a first length of time) between a time associated with a previous group of text (e.g., an end time at which a previous group of text (e.g., a previous group of text of a same or different type as the current group of text) is displayable) and a time associated with the current group of text (e.g., a start time at which the current group of text is displayable, as discussed below with reference to the segment characteristic identification module 210). The current group of text can be determined as the corresponding transcript segment (e.g., the corresponding subtitle) based on the first length of time meeting or exceeding a threshold length of time. Additionally or alternatively, the current group of text can be determined as the corresponding transcript segment based on a length of time (e.g., a second length of time associated with a succeeding group of text (e.g., a succeeding group of text of a same or different type as the current group of text), as measured from an end time of the current group of text (e.g., an end time, as discussed below with reference to the segment characteristic identification module 210) and a start time of the succeeding group of text) meeting or exceeding the threshold length of time.

The media segment generation system 202 can utilize the supplemental information mapping module 208 to map the supplemental information to transcript segment(s) in the corresponding transcript segment group(s) 224. Individual ones of the supplemental information can be utilized to determine the corresponding transcript segment(s) associated with the corresponding portion(s) of the media content (e.g., the media content 220). By way of example, the transcript segment(s) associated with the portion(s) of the media content 220 can be determined and utilized to map one or more supplemental information (e.g., third-party content received in third-party information 226) to the transcript segment(s). Individual ones of the supplemental information (e.g., portion(s) of the third-party content) can be mapped to the corresponding transcript segment(s) in the third-party information 226. In some examples, the third-party information stored in the third-party information database 118, as discussed above with reference to FIG. 1, can be implemented as the third-party information 226. In some examples, the mapping of the supplemental information (e.g., third-party content) can be implemented by the content portions mapping component 128 (e.g., the neural network component 136), as discussed above with reference to FIG. 1. The mapping can be utilized to determine one or more identified transcript segments 228, with individual ones of the identified transcript segment(s) 228 associated with the portion of the media content 220 being determined based on the corresponding portion(s) of the third-party content. The mapping can be utilized to determine the identified transcript segment(s) 228 for individual ones of the media content 220 (e.g., the identified transcript segment(s) 228 can be determined for each of the portions of the media content, such as the media content 220).

The supplemental information mapping module 208 can be utilized to map individual ones (e.g., a quote) of the supplemental information (e.g., third-party content(s) in the third-party information 226) to corresponding transcript segments (e.g., the corresponding subtitle) of the corresponding transcript segment group (e.g., the corresponding subtitle group, as discussed above with reference to FIG. 1) associated with the portion of the media content 220.

The media segment generation system 202 can utilize the segment characteristic identification module 210 to determine one or more transcript segment characteristics 230 associated with the identified transcript segment(s) 228. In some examples, a plurality of groups of transcript segment characteristics can be determined via the segment characteristic identification module 210 for the media content 220. Individual ones (e.g., a group of transcript segment characteristics (e.g., the transcript segment characteristic(s) 230)) of the groups of transcript segment characteristics can be determined for the corresponding portion of the media content (e.g., the media content 220).

By way of example, the segment characteristic identification module 210 can be utilized to determine the transcript segment characteristic(s) 230 associated with the portion of the media content 220. The transcript segment characteristic(s) 230 can include one or more transcript segment characteristic subgroups. In some examples, individual ones of the transcript segment characteristic subgroups (e.g., a transcript segment characteristics subgroup) can be associated with the corresponding identified transmit segment(s) 228 (e.g., an identified transmit segment 228). In those examples, the transcript segment characteristics subgroup in the transcript segment characteristic(s) 230 associated with the identified transmit segment 228 can include a start time (e.g., a start time at which the identified transmit segment 228 is displayable) and/or an end time (e.g., an end time at which the identified transmit segment 228 is displayable) of the identified transmit segment 228. In some examples, the determining of the transcript segment characteristic(s) 230 can be implemented by the content portions mapping component 128, as discussed above with reference to FIG. 1.

The media segment generation system 202 can utilize the transcript segment parsing module 212 to parse the identified transcript segment(s) 228. In some examples, the identified transcript segment(s) 228 can be parsed (e.g., text parsed, subtitle text parsed, etc.) utilizing the supplemental information and/or the transcript segment characteristic(s) 230. In some examples, the parsing of the identified transcript segment(s) 228 can be implemented by the content portions mapping component 128 and/or the neural network component 136, as discussed above with reference to FIG. 1. In those examples, individual ones of transcript segment characteristics subgroups in the corresponding group of transcript segment characteristic(s) (e.g., the transcript segment characteristic(s) 230) associated with the portion of the media content 220 can be utilized to parse the corresponding identified transcript segment(s) 228. By way of example, the group of transcript segment characteristic(s) (e.g., the transcript segment characteristic(s) 230), which is associated with the portion of the media content 220, can be utilized to parse the identified transcript segment(s) 228 associated with the portion of the media content 220. The parsing can be utilized to determine parsed transcript segment(s) 232 associated with the portion of the media content 220.

In a hypothetical example, identified transcript segments (e.g., subtitles) can be parsed (e.g., text parsed, subtitle text parsed, etc.). Parsing of the subtitles can be performed utilizing any information associated with the subtitles that is received from the third-party system 108, and/or characteristics associated with the subtitles. Parsing can be utilized to determine a section of a movie (e.g., "A Few Good Men") associated with the quote (e.g., "You can't handle the truth!"). The parsing can be utilized to separate the section of the movie in which the character says the quote "You can't handle the truth!," based on the section of the movie being associated with the subtitle with "You can't handle the truth!." The section of the movie can be determined and separated from other sections of the movie associated with other subtitles. A start time and end time of the section of the movie can be determined and utilized to determine the section of the movie. The section of the movie can be determined as a movie clip.

The media segment generation system 202 can utilize the media content analysis modules 214 to determine identified media content segment(s) 234 in the portion of the media content 220. The identified media content segment(s) 234 can be determined (e.g., identified) based on the parsed transcript segment(s) 232, by utilizing the media segment identification module 216. Individual ones of the identified media content segment(s) 234 can be determined to be associated with the corresponding parsed transcript segment(s) 232, based on the corresponding group of transcript segment characteristics (e.g., the transcript segment characteristic(s) 230). By way of example, a media segment can be determined to be associated with a parsed transcript segment, based on the corresponding group of transcript segment characteristics associated with the parsed transcript segment. In some examples, the determining of the identified media content segment(s) 234 can be determined and/or can be implemented by the content portions mapping component 128 (e.g., the neural network component 136), as discussed above with reference to FIG. 1.

In some examples, any of the identified media content segment(s) 234 can be generated as part of a media content segment associated with the corresponding parsed transcript segment(s) 232 (e.g., the identified media content segment(s) 234 can be modified to be shorter than the media content segment associated with the corresponding parsed transcript segment(s) 232). In other examples, any of the identified media content segment(s) 234 associated with the corresponding parsed transcript segment(s) 232 can be generated as a combination of one or more others of the identified media content segment(s) 234, or as a combination of one or more parts of others of the identified media content segment(s) 234.

As a hypothetical example, a part of a fight scene in a movie can be combined with a part of another fight scene in the movie. The combined fight scenes can be utilized to generate a media clip (e.g., one or the identified media content segment(s) 234). The media clip could also include portions of all of the popular fight scenes in the movie, or a combination of some of the fight scenes and some comedy scenes.

The media segment generation system 202 can utilize the segment editing module 218 to edit the identified media content segment(s) 234. In some examples, the editing of the identified media content segment(s) 234 can include any type of editing, such as smoothing, enhancing, adding music content (also referred to herein as "music"), adding audio content (also referred to herein as "audio"), text content (also referred to herein as "text" or "subtitles")), and/or video content (also referred to herein as "video"), generating music videos, generating action videos (e.g., fight scene videos), generating summaries (e.g., a summary of a partial or entire amount of the segment), and the like. The editing can be utilized to improve quality, change (e.g., increase or decrease) an aspect (e.g., humor, romance, intensity level, etc.) of the segment, which may result in a different impression of the user (e.g., viewer) or a different effect (e.g., emotion response) on the user. In some examples, the modification of the start time(s) and/or the end time(s) can be implemented by the content portions mapping component 128 (e.g., the neural network component 136) and/or the segment editing component 130, as discussed above with reference to FIG. 1.

In some examples, the editing of the editing module 218 can include modifying one or more of the start time and/or the end time associated with individual ones of the identified media content segment(s) 234 (e.g., to crop individual ones of the identified media content segment(s) 234). In some examples, one or more of the start time and the end time associated with an identified media content segment of the identified media content segment(s) 234 can be modified.

In some examples, the enhancing can include sharpening, converting from color to black-and-white, converting from black-and-white to color, adding images (e.g., gifs), adding aesthetically appealing attributes (e.g., outline/edge designs, borders, lines/swoops for objects (e.g., sports balls, characters, etc.) in motion, visual indicators such circles, stars, or other marks to highlight aspects (e.g., objects), etc.), adding attributes (e.g., humorous/funny attributes that can be similar, or different from, the aesthetically appealing attributes) likely to invoke responses (e.g., emotional responses) from the user or effect the user, etc.

In some examples, the adding of the music can include adding music (e.g., foreground or background music) that accompanies audio/video associated with the identified media content segment(s) 234, such as music underlaying dialog. The music can replace or supplement existing music (e.g., foreground or background music). The music can be utilized for music videos. For instance, with examples in which an identified media content segment 234 is a music video, music can replace or supplement existing music in the music video (e.g., a partial or an entire amount of the existing music in the music video).

In some examples, the adding of the audio can include adding sound effects (e.g., sounds synchronized with movement (e.g., dancing, fighting, athletic actions, or other types of movements/maneuvers) of objects, dialog (e.g., dialog in a same language or different language, dubbed audio by a different actor, etc.), and the like.

In some examples, the adding of the text can include text in a same or different language. The added text can include one or more of text in a same or different language than existing text, updated text to clarify existing dialog, supplemental or replacement text to clarify existing text, different text to invoke responses and/or effect the user, and the like.

In some examples, the adding of the video can include video that is sharper, less sharp (e.g., "gritty"), stylized (e.g., partially or fully computer created content, animation, etc.), brighter, easier to view, and the like. The video can include supplemental or replacement video with variations (e.g., different actor(s), different aspects (e.g., backdrops, lighting, coloring, etc.) of scenes, etc.), and the like.

Although the modules (e.g., the transcript extraction module 204, the transcript segmentation module 206, the supplemental information mapping module 208, the segment characteristic(s) identification module 210, the transcript segment parsing module 212, the media segment identification module 216, and the segment editing module 218) are discussed separately from the components of the media content management system 106 discussed above with reference to FIG. 1, it is not limited as such. Any of the modules can be integrated with any of one or more of the other modules and/or any of the components the media content management system 106 of FIG. 1.

In the hypothetical example, the start time and/or the end time of the movie clip can be modified to be more appropriately determined. The start time and/or the end time of the movie clip can be modified to ensure the movie clip is smoothly viewable by the user. The start time can be modified to avoid cutting off a part of the quote "You can't handle the truth!," such as the word "You," being said by an actor (e.g., Jack Nicholson) in the movie. Or, the start time can be modified to avoid cutting off part of the question said by another actor (e.g., Tom Cruise) in the movie, to which the quote "You can't handle the truth!" is said in response. Alternatively, or additionally, the end time can be modified to avoid cutting off the end of the quote, or to avoid stopping the media clip to early such, thereby avoiding cutting away from the scene too early. But modifying the end time of the media clip to be later, the media clip can be sure to include all of the dialog (e.g., speech) associated with the quote and/or all reactions of other actors in the movie that are an important part of the scene, after the actors says the quote "You can't handle the truth!".

In some examples, one or more of the characteristic(s) (e.g., the transcript segment characteristic(s) 230) associated with individual ones of the identified media content segment(s) 234 can be modified. In some examples, all of the characteristic(s) (e.g., the transcript segment characteristic(s) 230) associated with individual ones of the identified media content segment(s) 234 can be refrained from being modified. In either of the above discussed examples, the individual ones of the identified media content segment(s) 234 can be output as corresponding edited media segment(s) 236. Any of the identified media content segment(s) 234 can be determined as the edited media segment(s) 236, notwithstanding the segment editing module 218 determining that all of the characteristic(s) remain the same. The edited media segment(s) 236 can include characteristic(s) determined to remain the same based on the segment editing module 218 determining the characteristic(s) associated with the identified media content segment(s) 234 do not need to be modified. The segment editing module 218 can determine the characteristic(s) associated with an identified media content segment do not need to be modified based on determining the start time and the end time of the identified media content segment do not need to be modified to avoid audio content and/or video content from being interrupted. The segment editing module 218 can transmit, for storage, the edited media segment(s) 236 to the media content information database 112 and/or the media segment database 114.

Although the edited media segment(s) 236 can be transmitted to the media content information database 112 and/or the media segment database 114 as discussed above in the current disclosure, it is not limited as such. Any type of media segment (e.g., any of the identified media content segment(s) 234) can be stored and utilized in a similar way as for the edited media segment(s) 236.

As a hypothetical example, a movie can be analyzed to determine subtitles associated with the movie. Quotes can be obtained from a third-party system. The quotes can be mapped to the subtitles to determine which subtitles (e.g., identified subtitles) are associated with sections of the movie that are likely to be viewed by a user. The sections of the movie can be determined by mapping the identified subtitles with the movie. The sections of the movie, to which the identified subtitles map, can be displayed on a display device to be viewed by the user. The user can share the sections of the movie, view the sections of the movie, and/or view the full movie.

As a hypothetical example, another movie ("Dil Se.") that includes a scene with actors (e.g., Shah Rukh Khan and Malaika Arora) dancing and singing can be utilized to generate a music video. Quotes ("Chaiyya Chaiyya") that are obtained by a third-party of lyrics in the song can be mapped to subtitles ("Chaiyya Chaiyya") associated with the singing. The section of the other movie with the dancing and the singing can be generated as a movie clip and displayed so that users can watch the clip. The clip can also include other scenes in the movie that also have dancing and singing. The clip can be generated as a music video, with any dancing and singing scenes from the movie. The movie clips can be displayed with quizzes. The quizzes can include questions about the movie and/or the musical scenes.

As a hypothetical example, a media clip generated for a movie can include significant media segments of the movie, such as media segments associated with major plot points. A movie ("Se7en") that includes seven scenes with different crimes can be summarized as a clip including one or more of the seven scenes, leaving out segments of sections, and/or whole sections (e.g., scenes) of a type (e.g., "spoilers") that are likely to be unwanted by the viewer. The scenes selected for the media clip can be determined based on any portion of the supplemental information. The media clip can be updated on an ongoing based on user feedback that is continually received.

Although modules can operate in order of the transcript extraction module 204, the transcript segmentation module 206, the supplemental information mapping module 208, the segment characteristic(s) identification module 210, the transcript segment parsing module 212, the media segment identification module 216, and the segment editing module 218 as discussed above in this disclosure, it is not limited as such. The modules can operate in any order and utilizing any combination/type of information (e.g., the media content information, the supplemental information, etc.) discussed herein.

By way of example, a period of time at which the media segment identification module 216 performs operations for determining a media content segment (e.g., a media clip) that is associated with a parsed transcript segment (e.g., a quote) associated with a previous extracted transcript can be partially or entirely the same as a period of time at which the transcript extraction module extracts a transcription for a different media content. By way of another example, a period of time at which the media segment identification module 216 performs operations for determining a media content segment (e.g., a media clip) that is associated with a parsed transcript segment (e.g., a quote) associated with a previous extracted transcript can be partially or entirely the same as a period of time at which the supplemental information mapping module 208 performs operations for identifying transcript segments (e.g., subtitles) based on third-party content (e.g., quotes) for a different media content portion. Any of the modules discussed above can operate on an ongoing basis to continually identify, replace, modify, any of the media content information based on the supplemental information.

Although the modules (e.g., the transcript extraction module 204, the transcript segmentation module 206, the supplemental information mapping module 208, the segment characteristic(s) identification module 210, the transcript segment parsing module 212, the media segment identification module 216, and the segment editing module 218) can utilize the third-party information 226 to determine the edited media segment(s) 236 as discussed above in this disclosure, it is not limited as such. Any of the modules can be implemented to utilize one or more of any type of supplemental information in a similar way as for the third-party information 226.

In some examples, the supplemental information mapping module 208 can map any type of the supplemental information (e.g., the manually determined audio information and/or manually determined video information) to any media content information (e.g., media content related information, a portion of the media content 220, etc.). The mapping of the supplemental information mapping module 208 can be performed utilizing an ML model (e.g., the neural network component 136, as discussed above with reference to FIG. 1).

In those examples, the segment characteristic mapping module 210 can determine (e.g., identify) characteristics (e.g., features) associated with any of the information (e.g., the media content related information, the portion of the media content 220, etc.) determined by the supplemental information mapping module 208. For instance, with examples in which the supplemental information includes manually determined audio information (e.g., manually determined audio information that was previously matched with other audio features during training of the ML model), the segment characteristic mapping module 210 can determine characteristics (e.g., audio features) of a portion of the media content 220. The audio features can be determined by utilizing a mel spectrogram to convert audio of the portion of the media content 220 into frequency distribution data (e.g., a data representation, including 0's and 1's). The determining of the audio features can be based on a comparison between the frequency distribution data and the manually determined audio information. A result of the comparison can be determined as the audio features.

The identified characteristics (e.g., features) associated with the media content information (e.g., media content related information, a portion of the media content 220, etc.) can be associated with one or more classifications (e.g., dance scenes, fight scenes, battle scenes, comedy scenes, etc.). A classification identifier can be output by the ML model (e.g., the neural network component 136, as discussed above with reference to FIG. 1) for each one or more of the determined audio features. However, the disclosure is not limited as such, and can include a classification identifier for individual groups with any amount of audio features, such as a group that includes related audio features (e.g., a partial or an entire amount of audio features associated with one of the above identified scenes of any type).

In those examples, the transcript segment parsing module 212 can parse the identified audio features. In some examples, the identified audio features can be parsed utilizing the supplemental information (e.g., the manually determined audio information that was previously matched with other audio features during training of the ML model). In some examples, the parsing of the identified audio feature can be implemented by the content portions mapping component 128 and/or the neural network component 136, as discussed above with reference to FIG. 1. In those examples, audio features group identifiers associated with individual groups of identified audio features that are related (e.g., associated with a same scene or an amount (e.g., a partial or an entire amount) of a scene) can be determined. The parsed groups of identified audio features can be utilized by the media segment identification module 216, in a similar way as for the parsed transcript segment(s) 232, to determine the identified media content segment(s) 234.

Although parsed groups of identified audio features can be determined based on the manually determined audio information and utilized to determine the identified media content segment(s) 234 as discussed above in the current disclosure, it is not limited as such. Parsed groups of identified video features can be determined based on manually determined video information (e.g., manually determined video information that was previously matched with other video features during training of the ML model) and utilized to identify the media content segment(s) 234 in a similar way as for the parsed groups of identified audio features.

In some examples, the manually determined audio information (e.g., the manually determined audio information that was previously matched with other audio features during training of the ML model) utilized by the segment characteristic identification module 210 can include one or more amplitudes (e.g., an amplitude meeting or exceeding a threshold amplitude, an amplitude that is less than a threshold amplitude, etc.) that distinguish sounds in audio associated with types of scenes by types (e.g., music/singing in dance scenes, body (e.g., hand, feet, etc.) movements in fight scenes, soldier movements (e.g., marching, running, etc.) in battle scenes, laughing in comedy scenes, and the like). The manually determined video information (e.g., the manually determined video information that was previously matched with other video features during training of the ML model) utilized by the segment characteristic identification module 210 can include one or more pixel patterns that distinguish between views in video as being associated with types of scenes in a similar way as the amplitudes utilized to distinguish between the sounds.

Any of the manually determined information (e.g., the manually determined audio information and/or the manually determined video information) can include, and/or be utilized along with, information associated with the content utilized to generate the manually determined information. The information associated with the content can be provided by the user and can include similar information as in the media content related information. The information associated with the content can be stored in a similar way as the manually determined information.

As a hypothetical example, a portion of the media content (e.g., 220) can include a movie (e.g., Gladiator). Audio of the movie "Gladiator" can be analyzed by the supplemental information mapping module 208 to map sounds in the audio sounds to sounds in the manually determine audio information.

In the hypothetical example discussed above, the segment characteristic module 210 can identify audio features (e.g. swords clashing, or punches being thrown, in a fight scene (e.g., a final fight scene between characters played by Russell Crowe and Joaquin Phoenix) associated with the sounds. The audio features can be determined by utilizing a mel spectrogram to convert audio of the movie "Gladiator" into frequency distribution data (e.g., a data representation, including 0's and 1's). The determining of the audio features can be based on a comparison between the frequency distribution data and the manually determined audio information. The clashing of swords can be identified based on amplitude of the clashing swords matching the amplitudes of clashing swords in the manually determined audio information. A classification identifier (e.g., a fight scene identifier, a swords clashing identifier, etc.) can be output by the ML model for each one or more of the occurrences of swords clashing.

In the hypothetical example discussed above, the transcript segment parsing module 212 can parse the audio features from the movie "Gladiator" to determine a fight scene group identifier associated with each of the fight scenes, such as the final fight scene. Any fight scene can be determined based on one or more of the audio features (e.g., all occurrences of swords clashing, punches being throw, etc. that are grouped together in a certain period of time, along with related dialog and/or movement of the characters). The fight scene can be identified based on one or more of a group of subtitles, a group of audio features, and a group of video features associated with the scene. The parsed group associated with the fight scene can be utilized by the media segment identification module 216, in a similar way as for the parsed transcript segment(s) 232, to determine the identified media content segment(s) 234, such as a media clip of the final fight scene.

Although the terms "component(s)" and "module(s)" are discussed in various portions of this disclosure, it is not limited as such. The terms "component(s)" and "module(s)" are used for convenience and simplicity and are interchangeable.

Figure 3:
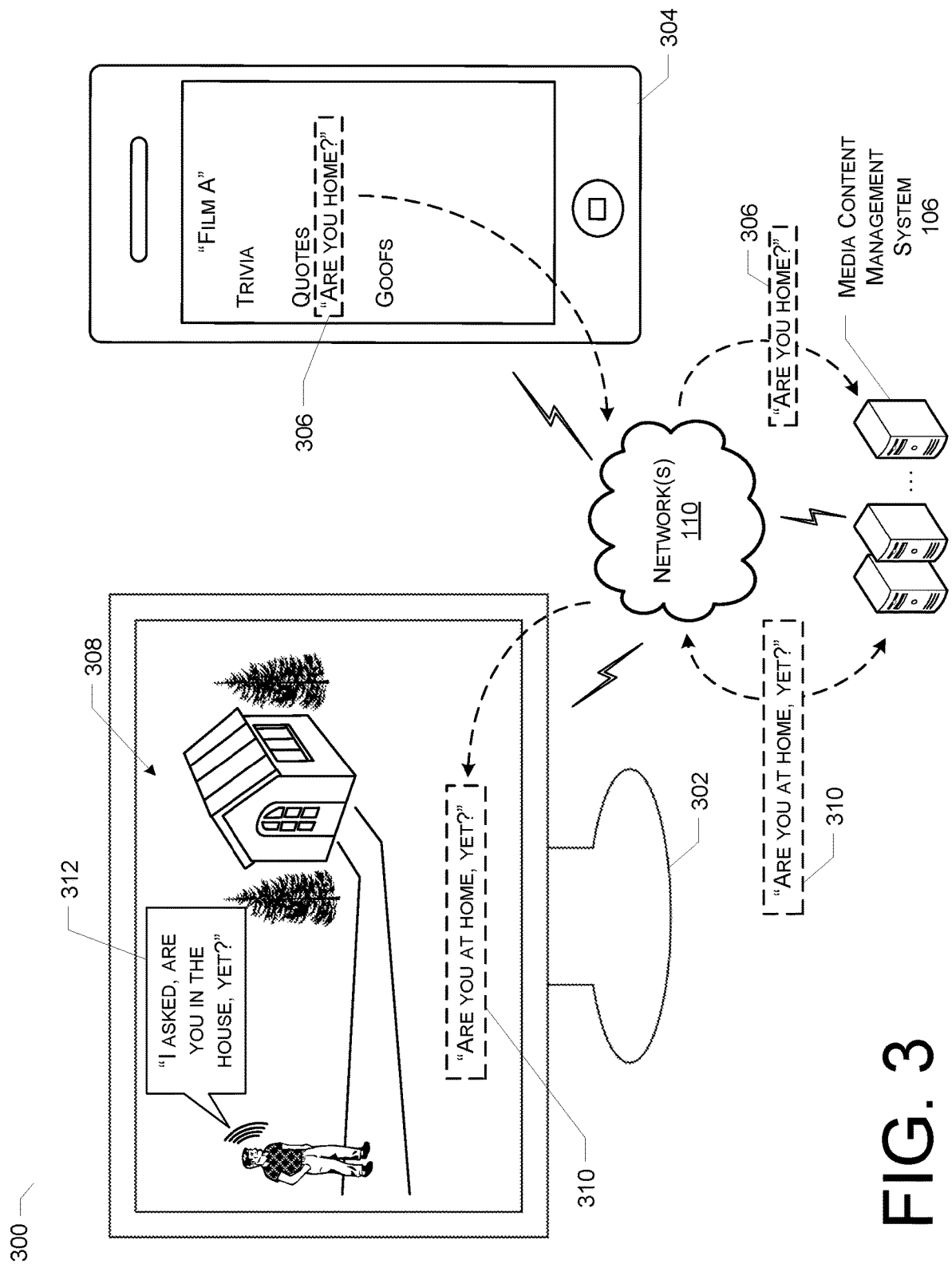
FIG. 3 is an example environment for analyzing and modifying media content included in media content information for displaying media segments associated with the media content.

FIG. 3 is an example environment 300 for analyzing and modifying media content included in media content information for displaying media segments associated with the media content.

As shown in FIG. 3, the environment 300 can include a display device 302, a display device 304, and the media content management system 106. Individual ones of the display device 302 and the display device 304 can be implemented in a similar way as the display device 104 and can be communicatively coupled to the media content management system 106 via network(s) 110, as discussed above with reference to FIG. 1.

In some examples, the media content management system 106, as discussed above with reference to FIG. 1, can utilize the supplemental information extraction component 124 to extract supplemental information (e.g., third-party content (e.g., a quote) 306) provided by the third-party system 108 via the network(s) 110. In those examples, the quote 306 that is extracted can be transmitted by the display device 304 and to the third-party system 108. The media content management system 106 can utilize the media content identification component 126 to determine a media content identifier (e.g., a title (e.g., "Film A") of a portion of media content 308 with which the supplemental information (e.g., the quote 306) is associated. The media content identifier in the supplemental information can be mapped with the media content identifier (e.g., the title of the portion of the media content 308) in the media content information (e.g., the media content related information associated with the portion of the media content 308). The media content identifier in the media content information can be retrieved from the media content information database 112 (e.g., retrieved from the media content information database 112 in response to a request transmitted by the media content management system 106 to the media content information database 112).

The media content management system 106 can utilize the content portions mapping component 128 and/or the neural network component 136, as discussed above with reference to FIG. 1, to determine segments (e.g., one or more transcript segments (e.g., subtitle(s)) of a transcript associated with the portion of the media content 308 (e.g., a transcript included in a media file that includes the portion of the media content 308). In some examples, individual ones (e.g., a subtitle 310) of segments (e.g., transcript segments of a transcript) of the transcript associated with the portion of media content 308 can be determined to be associated with the corresponding supplemental information (e.g., third-party content (e.g., the quote 306)). Individual ones of the subtitle(s), such as the subtitle 310, can be associated with one or more corresponding dialog segments, such as a dialog segment 312.

In some examples, the transcript (e.g., a subtitle group) can be received by the media content management system 106 from the media content information database 112.

By utilizing the neural network component 136 (e.g., the deep neural network of the neural network component 136), the individual ones (e.g., the quote 306) of the supplemental information (e.g., third-party content) can be mapped to the corresponding segments (e.g., the subtitle 310) of the portion of the media content 308 notwithstanding one or more of the mappable elements (e.g., word(s)) of the individual ones (e.g., the quote 306) of the supplemental information (e.g., third-party content) being different from one or more of the corresponding mappable elements of the corresponding segments (e.g., the subtitle 310) of the portion of the media content 308. By way of example, the neural network component 136 can be utilized to map the quote 306 to the subtitle 310 notwithstanding the one or more of the quote 306 and the subtitle 310 having one or more different mappable elements (e.g., words) with respect to the corresponding dialog segment 312.

Figure 4C:
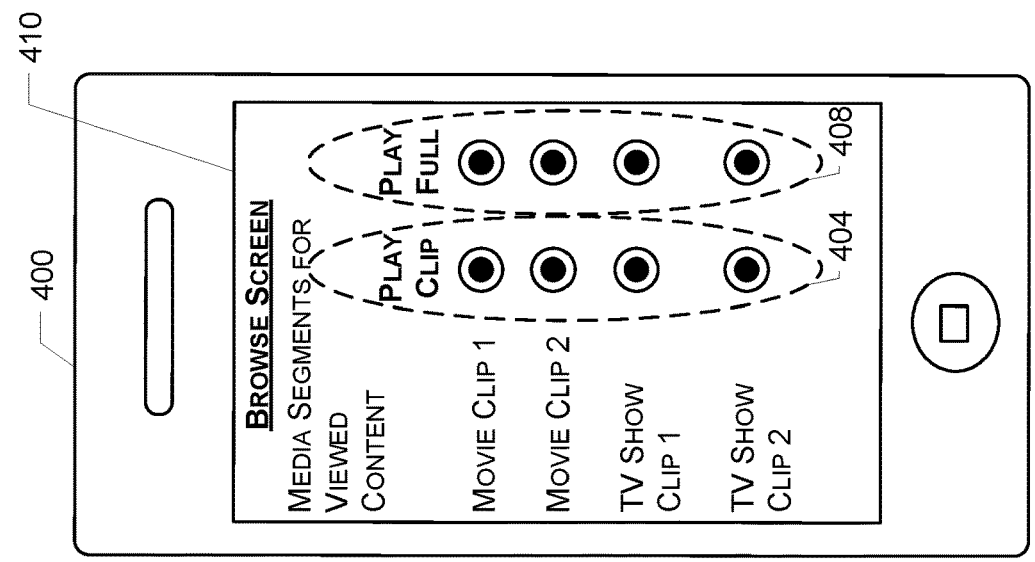
FIG. 4C is an illustrative mobile device utilizable for browsing viewed content and viewing extracted or full media segments.
Figure 4B:
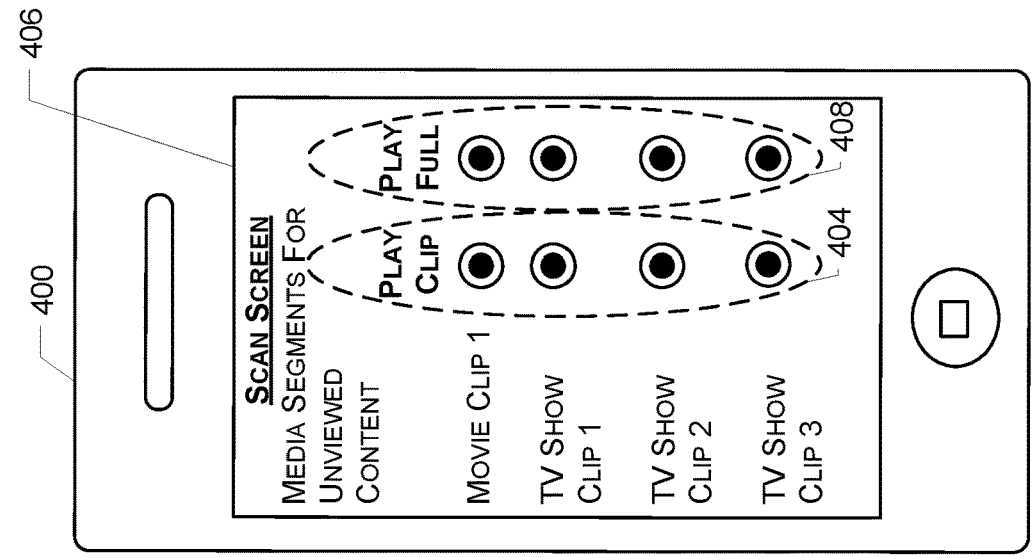
FIG. 4B is an illustrative mobile device utilizable for scanning unviewed content and viewing extracted or full media segments.
Figure 4A:
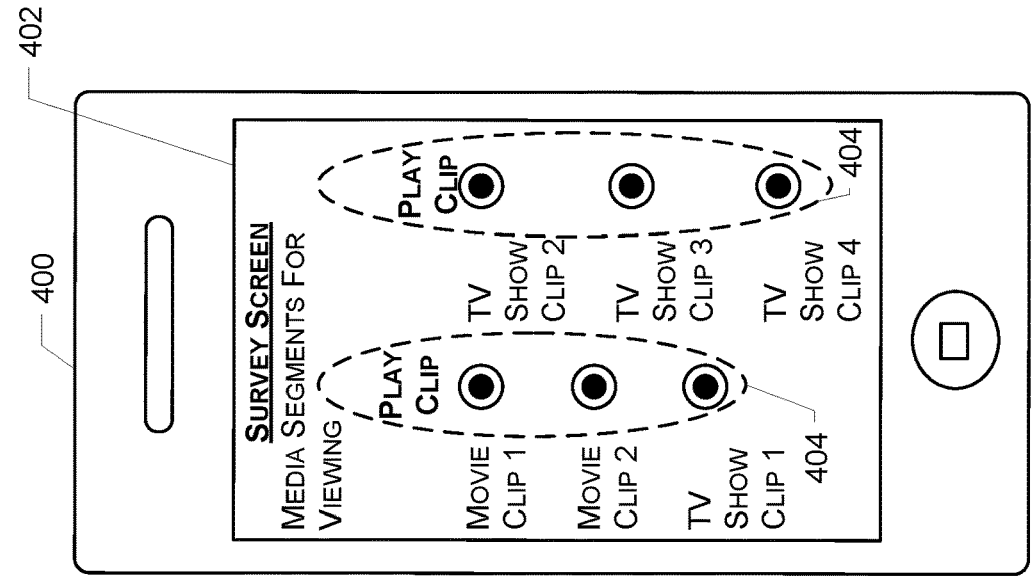
FIG. 4A is an illustrative mobile device utilizable for surveying content and viewing extracted media segments.

FIG. 4A is an illustrative mobile device 400 utilizable for surveying content and viewing extracted media segments. The mobile device 400 includes a user interface (UI) with a screen (e.g., a survey screen 402) that is used by the mobile device 400 to display a plurality of media segments for viewing by a user (e.g., the user 102).

In some examples, individual ones of the plurality of media segments can be implemented as corresponding edited media segments 236, as discussed above with reference to FIG. 2. In those examples, the edited media segments 236 can be received by the mobile device 400 and from the media segment database 114, via the media content management system 106 and the network(s) 110. The survey screen 402 can include a media content identifier (e.g., a title (e.g., "Movie Clip 1") of the media content associated with the edited media segment 236) associated with individual ones of the edited media segments 236.

The survey screen 402 can be utilized by the mobile device 400 to display a plurality of indicators 404. Individual ones of the plurality of indicators 404 can be utilized to receive input provided by a user (e.g., the user 102) via the mobile device 400. The mobile device 400 can present the corresponding edited media segment 236 based on the input. By way of example, the mobile device 400 can transmit a request associated with the edited media segment 236 to the media content management system 106. In some examples, the request can be transmitted based on selection of the media content identifier (e.g., input selecting the media content identifier) associated with the edited media segment 236, the selection (e.g., selection via touch input) being provided by the user via the external device. The media content management system 106 can transmit an amount (e.g., a partial amount or an entire amount) of the edited media segment 236 to the mobile device 400, to cause the mobile device to present a video associated with the edited media segment 236. In cases in which the partial amounts of the edited media segment 236 is transmitted to the mobile device 400, remaining amounts of the edited media segment 236 can be transmitted to the mobile device 400 during presentation of the edited media segment 236. By transmitting the remaining amounts during the presentation, the edited media segment 236 can be presented without interruption.

The survey screen 402 can also include a plurality of additional indicators associated with the corresponding edited media segments 236, to share the corresponding edited media segments 236 with other users. The plurality of additional indicators can be implemented in a similar way as the plurality of indicators 404. By selecting individual ones of the plurality of additional indicators, the users can control the display device to transmit messages to other users, or to post information to a social media application. The posted information to the social media application can include information indicating, explaining, or sharing that the corresponding edited media segments 236 have been shared by the user.

In some examples, individual ones of edited media segments 236 displayed in the survey screen 402 can be based on user information of the user or one or more other users. User information associated with individual ones of the user or the other user(s) can include user account information, user input information, user history information (e.g., a view history of media content(s)), user feedback information, or other types of user related information associated with users that access the media content database.

Although functions can utilize the edited media segments 236 as discussed above in this disclosure, it is not limited as such. Any of the functions utilizing the edited media segments 236 can be implemented in a similar way using media segments that are partially edited or unedited.

FIG. 4B is an illustrative mobile device 400 utilizable for scanning unviewed content and viewing extracted or full media segments. The mobile device 400 includes the UI, but with a scan screen 406 instead of the survey screen 402.

The scan screen 406 can be utilized by the mobile device 400 to display a plurality of indicators 404 and a plurality of indicators 408. The plurality of indicators 408 can be utilized to receive input in a similar way as the plurality of indicators 404. The scan screen 406 can be utilized by the mobile device 400 in a similar way as the survey screen 402, except with the edited media segments 236 that are displayed in the scan screen 406 being associated with portions of the media content that were unviewed by the user 102. By way of example, individual ones of edited media segments 236 displayed in the scan screen 406 can be associated with corresponding portions of media content based on an amount (e.g., a partial amount or an entire amount) of the portions of the media content having not been previously viewed by the user 102. In other examples, individual ones of edited media segments 236 displayed in the scan screen 406 can be associated with corresponding portions of the media content based on a partial amount of the corresponding portions of the media content having been previously viewed by the user 102, but an entire amount of the corresponding portions of the media content having not been previously viewed. In some examples, individual ones of edited media segments 236 displayed in the scan screen 406 can be based on the user information of the user or the other user(s), as discussed above for the survey screen 402.

The mobile device 400 can present the individual ones of the edited media segments 236 based on input provided by the user 102 and to the corresponding indicators 404, via the mobile device 400. The mobile device 400 can present the individual ones of portions of the media content associated with the corresponding edited media segments 236 based on input provided by the user 102 and to the corresponding indicators 408, via the mobile device 400. The individual ones of portions of the media content can be implemented in a similar way as the media content 220. The media content management system 106 can cause the mobile device to present a video associated with the media content 220 in a similar way as for the edited media segment 236.

FIG. 4C is an illustrative mobile device 400 utilizable for browsing viewed content and viewing extracted or full media segments. The mobile device 400 includes the UI, but with a browse screen 410 instead of the survey screen 402.

The browse screen 410 can be utilized by the mobile device 400 in a similar way as the scan screen 406, except with the edited media segments 236 that are displayed in the browse screen 410 being associated with portions of the media content that were viewed by the user 102. By way of example, individual ones of edited media segments 236 displayed in the browse screen 410 can be associated with corresponding portions of the media content based on an amount (e.g., a partial amount or an entire amount) of the portions of the media content having been previously viewed by the user 102. In some examples, individual ones of edited media segments 236 displayed in the browse screen 410 can be based on the user information of the user or the other user(s), as discussed above for the survey screen 402.

Although screens (e.g., the survey screen 402, the scan screen 406, and the browse screen 410) displayed by the UI of the mobile device 400 can be utilized to display media content identifiers and indicators in arrangements illustrated in FIGS. 4A-4C as discussed above in this disclosure, it is not limited as such. Individuals ones of the survey screen 402, the scan screen 406, and the browse screen 410 can display media content related information associated with individual portions of the media content of any type.

In some examples, an image (e.g., a film cover image, a film screen shot, an actor, a promotion image, etc.), text of any type, an indicator of any type, etc. associated with a media content can be displayed via the display device 400, alternatively or additionally, to the media content identifier. In some examples, features of any type can be displayed by the display device 400, alternatively or additionally, to the indicators (e.g., the indicators 404 and/or the indicators 408) and utilized to receive input provided by the user 102 and to the mobile device 400 to cause the mobile device 400 to present the media segment or the media content. In some examples, the media content identifier, or features displayed alternatively or additionally to the media content identifier, can be utilized (e.g., selectable) to receive input provided by the user 102 and to the mobile device 400 to cause the mobile device 400 to present the media segment or the media content.

In some examples, any arrangement of any format and/or type may be utilized to display screen information (e.g., the media content identifier, or features displayed alternatively or additionally to the media content identifier, the indicators, and/or the features displayed alternatively or additionally to the indicators, etc.). By way of example, individual ones of the screens (e.g., the survey screen 402, the scan screen 406, and/or the browse screen 410) can be utilized to display tabs that are individually selectable via touch input to the UI. The tabs can be utilized to change (e.g., rotate) between the screens.

In some examples, any portion of individual ones of the screens (e.g., the survey screen 402, the scan screen 406, and/or the browse screen 410) can be combined with one or more of the remaining screens. By way of example, the scan screen 406 and the browse screen 410 can be integrated to display media content identifiers, indicators 404, and/or indicators 408 for unviewed media content and for viewed media content on a same screen.

In some examples, any portion of individual ones of the screens (e.g., the survey screen 402, the scan screen 406, and/or the browse screen 410) can be combined with information to quiz users. The quiz can include inquiries about the portion of the media content or the media segment. The quiz can be associated with an incentive or an award, based on the answers provided by the users via the display devices. The users can receive the award based on a quiz score of the user being above a threshold score, or above any scores of a percentage of other users. The award can include discounts for viewing any media content, discounts for purchasing items (e.g., mail order items) available from the service provider, gift cards, etc.

Although the various screens (e.g., the survey screen 402, the scan screen 406, and/or the browse screen 410) can be displayed by a display device (e.g., the display device 104) as discussed above in this disclosure, it is not limited as such. Any type of device capable of supporting information utilized to display the screens can be utilized in a similar way as the display device 104. In some examples, a flatscreen device (e.g., a television device with connectivity (e.g., WiFi, Bluetooth, etc.)) can be utilized to display one or more of the screens by transmitting a request to the media content management system 106, based on any type of input to the TV device. By way of example, the TV device can be controlled in a similar way as the display device 104 based on input to a remote controller, which can send a request to the TV device. One or more communication(s) (e.g., one or more requests and or one or more responses) between the remote controller and the TV device, based on user input to the remote controller, can be utilized in a similar way as for any type or number of input to the display device 104 as discussed throughout this disclosure.

Figure 5:
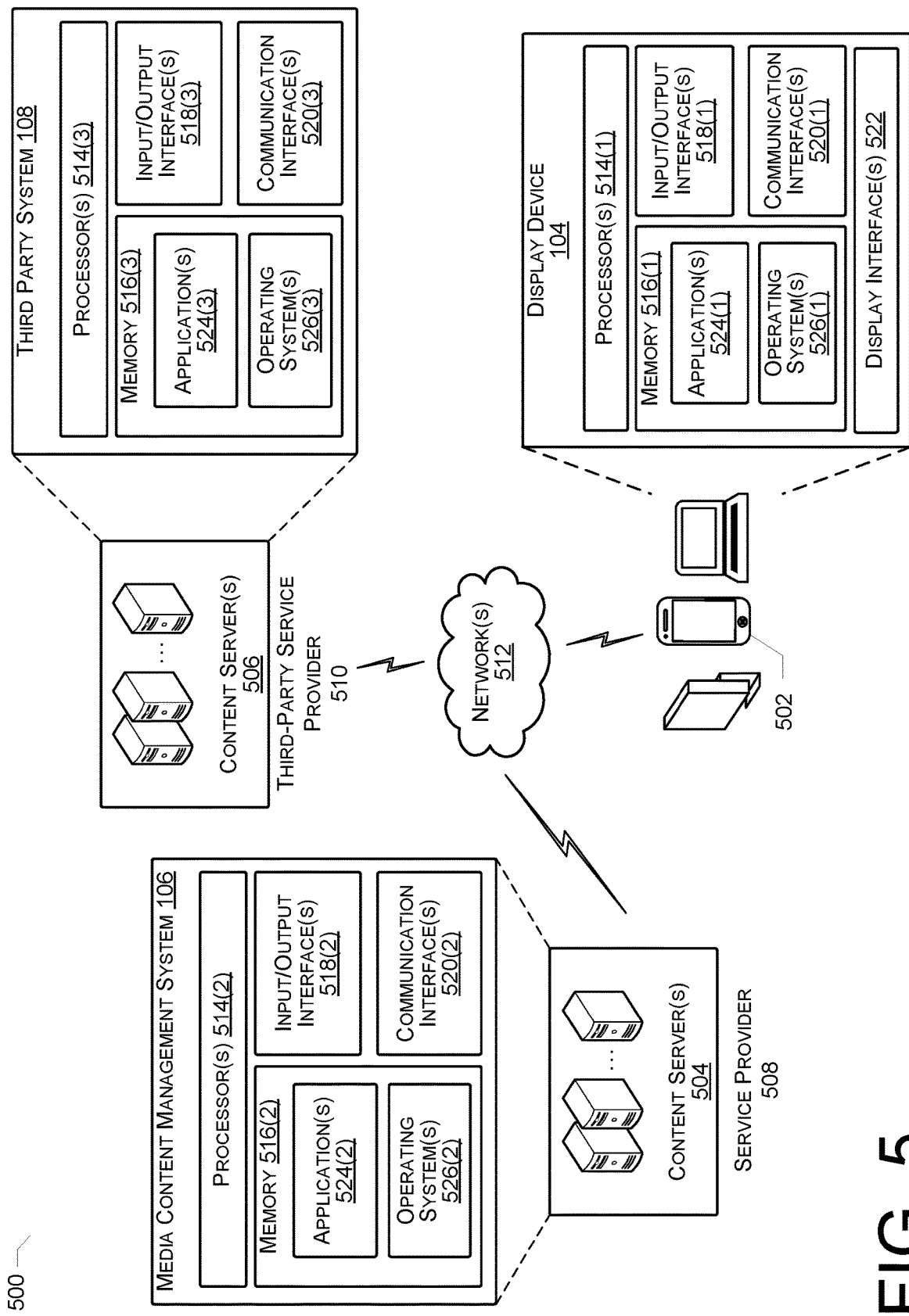
FIG. 5 is a system that includes multiple devices that coordinate the analyzing of media content, generating of modified media content, and presenting of the media content and the modified media content to a user.

FIG. 5 is a system 500 that includes multiple devices that coordinate the processing of video streams and requests associated with digital items in the video streams. The devices can include one or more display devices 502, one or more content servers 504, and one or more content servers 506.

The display device(s) 502 can include the display device 104 shown in FIG. 1. The content server(s) 504 can be associated with a service provider 508. The content server(s) 504 can be included in, and utilized to implement any functions of, the media content management system 106 shown in FIG. 1. The content server(s) 506 can be associated with a service provider 510. The content server(s) 506 can be included in, and utilized to implement any functions of, the third-party system 108 shown in FIG. 1.

The display device(s) 502, the content server(s) 504, and the content server(s) 506 can be configured to communicate with one another via one or more networks 512. The network(s) 512 can be included in, and utilized to implement any functions of, the network(s) 110 shown in FIG. 1. The display device(s) 502 can communicate with the content server(s) 504, such as to transmit requests to, and receive responses from, the content server(s) 504. The display device(s) 502 can communicate with the content server(s) 506, such as to transmit requests to, and receive responses from, the content server(s) 506. The content server(s) 504 and the content server(s) 506 can communicate between one another utilizing the network(s) 512. The display device(s) 502 can communicate between one another, in a similar way as for how they communication with the content server(s) 504 or the content server(s) 506.

The network(s) 512 can include the Internet, cable networks, cellular networks, wireless networks (e.g., Wi-Fi) and/or wired networks, as well as close-range communications such as Bluetooth®, Bluetooth® low energy, or the like. The display device(s) 502 can communicate with the content server(s) 504 and/or the content server(s) 506 utilizing different type of networks (e.g., networks with different protocols). For example, the display device(s) 502 can utilize a first type of network to communicate with the content server(s) 504. For example, the display device(s) 502 can utilize a second type of network that is the same as, or different from, the first type of network to communicate with the content server(s) 506. The network(s) 512 can include the Internet, cable networks, cellular networks, wireless networks (e.g., Wi-Fi) and/or wired networks, as well as close-range communications such as Bluetooth®, Bluetooth® low energy, or the like.

The display device(s) 502 can represent, but are not limited to, televisions (TVs), cellular telephones, desktop computers, server computers or blade servers such as webservers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device coverable of sending communications and performing the functions according to the techniques described herein. Among these TVs are liquid crystal display (LCD) TVs, light emitting diode (LED) TVs, organic light emitting diode (OLED) TVs, plasma display devices (PDP) TVs, quantum dot (QLED) TVs, and electroluminescent (ELD) TVs.

In the illustrated example, the display device(s) 502 configured to communicate with the content server(s) 504 and the content server(s) 506 include one or more processors 514(1), 514(2), and/or 514(3) (collectively processor(s) 514), at least one memory 516(1), 516(2), and/or 516(3) (collectively memory 516), one or more input/output (I/O) interfaces 518(1), 518(2), and/or 518(3) (collectively I/O interface(s) 518), and/or one or more communication (e.g., network) interfaces 520(1), 520(2), and/or 520(3) (collectively communication interface(s) 520). The display device(s) 502 can include one or more display interfaces 522.

Each processor 514 can include multiple processors and/or a processor having multiple cores. Further, the processor(s) 514 can include one or more cores of different types. For example, the processor(s) 514 can include application processor units, graphic processing units, and so forth. In various examples, the processor(s) 514 can include one or more microprocessors, microcomputers, microcontrollers, digital signal processors, central processing units, state machines, logic circuitries, and/or any devices that manipulate signals based on operational instructions. In some examples, the processor(s) 514 can include one or more hardware processors and/or logic circuits of any suitable type specifically programmed or configured to execute the algorithms and processes described herein.

For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 514 can possess its own local memory, which also can store program components, program data, and/or one or more operating systems.

In some examples, the processor(s) 514 can be configured to fetch and execute computer-readable processor-executable instructions stored in the memory 516. Depending on the configuration of the display device(s) 502, the content server(s) 504, and the content server(s) 504, the memory 516 can be an example of tangible non-transitory computer storage media and can include volatile and nonvolatile memory and/or removable and non-removable media implemented in any type of technology for storage of information such as computer-readable processor-executable instructions, data structures, program modules or other data. Such memory 516 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 516 can be implemented as computer-readable storage media ("CRSM"), which can be any available physical media accessible by the processor(s) 514 to execute instructions stored on the memory 516. In some examples, CRSM can include random access memory ("RAM") and Flash memory. In other examples, CRSM can include, but is not limited to, read-only memory ("ROM"), electrically erasable programmable read-only memory ("EEPROM"), or any other tangible medium which can be used to store the desired information, and which can be accessed by the processor(s) 514.

The memory 516 can be used to store and maintain any number of functional components that are executable by the processor 514. In some examples, these functional components include instructions or programs that are executable by the processor 514 and that, when executed, implement operational logic for performing the actions and services attributed above to the display device(s) 502, the content server(s) 504, and the content server(s) 504. Functional components of the display device(s) 502, the content server(s) 504, and the content server(s) 504 stored in the memory 516(1), 516(2), and/or 516(3) can include applications 524(1), 524(2), and/or 524(3) (collectively applications 524). The application(s) 524 can configure the respective devices to perform functions described herein such as with regard to FIGS. 1-5 and 7.

The functional components of the display device(s) 502, the content server(s) 504, and the content server(s) 504 stored in the memory 516(1), 516(2), and/or 516(3) can additionally include operating systems 526(1), 526(2), and/or 526(3), respectively (collectively operating systems 526). The operating system(s) 526 can be used for controlling and managing various functions of the display device(s) 502, the content server(s) 504, and the content server(s) 506. The memory 516 can also store other modules and data, which can include programs, drivers, etc., and the data used or generated by the functional components, to enable efficient and effective food order processing. Further, the display device(s) 502, the content server(s) 504, and the content server(s) 504 can include many other logical, programmatic and physical components, of which those described are merely examples that are related to the discussion herein. In addition, the memory 516 can also store data, data structures and the like, that are used by the functional components.

The I/O interface(s) 518, can include scanners (e.g., for scanning bar codes, QR codes, etc.), speakers, a microphone, a camera, and various user controls (e.g., buttons, a joystick, a keyboard, a keypad, etc.), a haptic output device, a 3D touch device, and so forth. The communication interface(s) 520 can include one or more interfaces and hardware components for enabling communication with various other devices over the network or directly.

Figure 6:
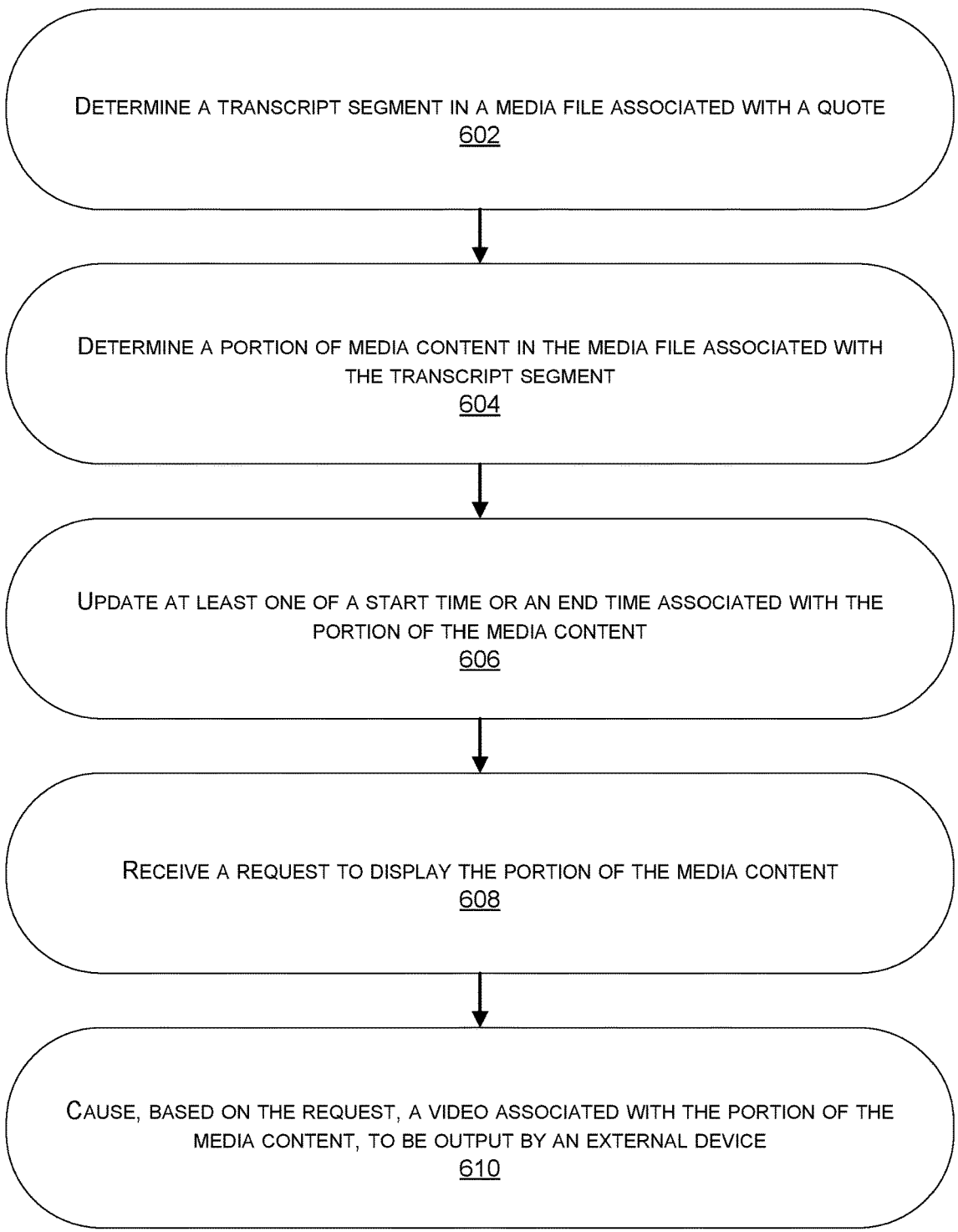
FIG. 6 is a flow diagram illustrating an example process of analyzing media content, generating modified media content, and presenting the media content and the modified media content to a user.

FIG. 6 is a flow diagram illustrating an example process 600 of processing a video stream and a request associated with a digital item in the video stream At 602, a media segment generation system 202 can determine a transcript segment (e.g., a subtitle) in a media file associated with a quote. The transcript segment can be associated with a portion of media content. The transcript segment can be implemented as one of the identified transcript segment(s) 228. The identified transcript segment 228 can be determined by extracting a transcript (e.g., one of the transcript(s) 222) from the portion of the media content, segmenting the transcript 222 to determine one of the transcript segment group(s) 224, and mapping the transcript segment group 224 to supplemental information (e.g., the third-party content) to identify the identified transcript segment 228.

At 604, the media segment generation system 202 can determine a segment (e.g., media segment) of a portion of the media content (e.g., a movie) associated with the identified transcript segment 228. The media segment (e.g., a movie clip) can be determined by text parsing of a transcript (e.g., the transcript 222) that includes the transcript segment (e.g., identified transcript segment 228). The transcript can be text parsed by utilizing the neural network component 136, as discussed above with reference to FIG. 1. The neural network component 136 can utilize a fuzzy matching algorithm to parse the transcript 222 and map the transcript 222 to the media content segment of the portion of the media content.

At 606, the media segment generation system 202 can update at least one of the start time or the end time associated with the media segment. The at least one of the start time and the end time can be updated by apply an editing algorithm (e.g., a smoothing algorithm) to the media segment.

At 608, the media segment generation system 202 can receive a request (e.g., a user request) to display the media segment. The request can be transmitted by, and received from, the display device 104.

At 610, the media segment generation system 202 can cause, based on the request, a video associated with the media segment to be output by an external device. The media segment generation system 202 can transmit a response to the display device 104. The response can include some or all of the media segment. The display device 104 can be caused, based on receiving the some or all of the media segment, to display, or to begin displaying, the media segment. The display device 104 can continue displaying the media segment as remaining data in the media segment is received from the media segment generation system 202, in the case that some of the media segment is received by the display device 104 at a time at which performance of the media segment begins.

Although the term "portion" of media content is utilized to refer to some media content of any type, such as a movie, a TV show, a documentary, etc., throughout this disclosure, it is not limited as such. The term "portion" of media content is utilized for simplicity. The term "portion" as used throughout disclosure can denote any segment/portion/amount of any object, information, etc. of any type. Although the term "segment" of media content is utilized to refer to a media clip of any type, throughout this disclosure, it is not limited as such. The term "segment" of media content is utilized for simplicity. The term "segment" as used throughout disclosure can denote any segment/portion/amount of any object, information, etc. of any type.

Although the term "user" is utilized throughout this disclosure, it is not limited as such and the term "user" is utilized for simplicity. The term "user" as used throughout disclosure can denote any type of user, including a user, a customer (e.g., a consumer) an administrator, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
at least one processor; and
at least one non-transitory computer-readable storage medium having computer-executable instructions stored thereon which, when executed on the at least one processor, cause the system to perform operations comprising:
storing a plurality of media files in a database, the plurality of media files including movies and television shows;
storing, in the database, a plurality of transcripts associated with the plurality of media files;
determining, from among the plurality of transcripts, a transcript associated with media content in a media file from among the plurality of media files;
extracting third-party information associated with a third-party web site;
determining a quote of a plurality of quotes in the third-party information associated with the media content;
determining first individual ones of a plurality of dialog segments associated with corresponding segments of the media content
determining second individual ones of a plurality of transcript segments of the transcript associated with the corresponding segments of the media content;
mapping, via a machine learning (ML) model, a quote to a media content segment of the media content that corresponds to one of the dialog segments matching the quote and one of the transcript segments matching the quote, a subtitle in the matching transcript segment having at least one first mappable element that is different from at least one corresponding mappable element of the quote, the at least one first mappable element including one or more of a first word, a first phrase, a first language, a first spelling, a first pronunciation, or a first punctuation, an audible utterance in the matching dialog segment having at least one second mappable element that is different from the at least one corresponding mappable element of the quote, the at least one second mappable element including one or more of a second word, a second phrase, a second language, a second spelling, a second pronunciation, or a second punctuation;
applying a smoothing algorithm to the media content segment to crop the media content segment;
receiving, based on input provided by a user via an external device, a request to display the media content segment; and
causing, based on the request, a video associated with the media content segment, to be output by the external device.

2. The system of claim 1, wherein the ML model is trained, as a trained ML model, by inputting training data to the ML model, the training data including a plurality of training portions of text, a plurality of training quotes, and a plurality of training relationships that indicate associations between individual ones of the plurality of training portions of text and individual ones of the plurality of training quotes, wherein mapping the quote further comprises:
inputting, into the trained ML model, the transcript;
determining, by the trained ML model and via a fuzzy matching algorithm, the media content segment associated with the subtitle and the audible utterance; and
outputting, by the trained ML model, the media content segment.

3. The system of claim 1, the operations further comprising:
causing at least one of a survey screen, a scan screen, or a browse screen to be output by the external device, the survey screen being utilizable to at least one of request performance of, or share, a second media content segment, the second media content segment being sharable by the external device, to at least one other user, the scan screen being utilizable to at least one of scan, or request performance of a third media content segment, the third media content segment having not been previously presented to the user, the browse screen being utilizable to at least one of browse, or request performance of a fourth media content segment, the fourth media content segment having been previously presented to the user; and
causing the at least one of the second media content segment, the third media content segment, or the fourth media content segment to be output by the external device, based on second input provided by the user via a user interface of the external device.

4. The system of claim 1, wherein causing the video to be output further comprises:
   determining at least one of a first viewing history associated with the user or a plurality of second viewing histories associated with corresponding other users;
   determining a likelihood of the media content segment being viewed by the user, based on the at least one of the first viewing history or the plurality of second viewing histories; and
   causing the video associated with the media content segment to be output by the external device, based on the likelihood of the media content segment being viewed by the user.

5. The system of claim 1, the operations further comprising:
   determining, based on the third-party information, at least one of trivia data or user identified media content errors data associated with the media content; and
   determining that a second transcript segment of the plurality of transcript segments is associated with the at least one of the trivia data or the user identified media content errors data.

6. The system of claim 1, wherein mapping the quote to the media content segment further comprises:
   mapping, as mapped dialog segments, the plurality of dialog segments to a plurality of media content segments;
   mapping, as mapped transcript segments, the plurality of transcript segments to the plurality of media content segments; and
   operating the ML model on the mapped dialog segments and the mapped transcript segments to identify the media content segment associated with the quote.

7. The system of claim 1, wherein the at least one first mappable element of the subtitle includes a first phrase and one or more of the first language, the first spelling, the first pronunciation, or first punctuation,
   wherein the at least one second mappable element of the audible utterance includes a second phrase, and one or more of the second language, the second spelling, the second pronunciation, or the second punctuation, and
   wherein the at least one first mappable element is different from the at least one second mappable element.

8. The system of claim 1, further comprising:
   obtaining the plurality of dialog segments in a dialog file, the dialog file being separate from the media file and from a subtitles file that includes the transcript.

9. The system of claim 1, further comprising:
   identifying other third-party information obtained from one or more third-party systems that are different from a third-party system associated with the third-party web site; and
   mapping, via the ML model, the other third-party information to a second media content segment of the media content that is associated with i) one of the dialog segments corresponding to the other third-party information, and ii) one of the transcript segments corresponding to the other third-party information.

10. A system comprising:
    at least one processor; and
    at least one non-transitory computer-readable storage medium having computer-executable instructions stored thereon which, when executed by the at least one processor, cause the system to perform operations comprising:
    causing a media file including media content to be stored in a database;
    determining first individual ones of a plurality of dialog segments associated with corresponding segments of media content in the media file;
    determining second individual ones of a plurality of transcript segments of a transcript associated with the corresponding segments of the media content;
    mapping, by a machine learning (ML) model, a third-party quote to a media content segment of the media content that corresponds to one of the dialog segments matching the third-party quote and one of the transcript segments matching the third-party quote, a subtitle in the matching transcript segment including at least one first mappable element that is different from at least one corresponding mappable element of the third-party quote, the at least one first mappable element including one or more of a first word, a first phrase, a first language, a first spelling, a first pronunciation, or a first punctuation, an audible utterance in the matching dialog segment having at least one second mappable element that is different from the at least one corresponding mappable element of the third-party quote, the at least one second mappable element including one or more of a second word, a second phrase, a second language, second spelling, second pronunciation, or second punctuation;
    receiving, based at least in part on user input provided via an external device, a user request to display the media content segment; and
    causing, based at least in part on the user request, a video associated with the media content segment to be output by the external device.

11. The system of claim 10, further comprising:
    determining a start time and an end time associated with the matching transcript segment; and
    determining, by text parsing of the transcript and based at least in part on the start time and the end time, the media content segment.

12. The system of claim 10, wherein receiving the user request to display the media content segment further comprises:
    causing an identifier associated with the media content segment to be output by the external device; and
    receiving the user request to display the media content segment, the user request being transmitted by the external device based at least in part on user selection of the identifier provided via the external device.

13. The system of claim 10, wherein the matching transcript segment is a first transcript segment included in the transcript, the operations further comprising:
    determining, based at least in part on third-party information, user-identified media content errors data associated with the media content; and
    determining that a second transcript segment in the transcript is associated with the user-identified media content errors data.

14. The system of claim 10, wherein the ML model is trained, as a trained ML model, by inputting training data to the ML model, the training data including a plurality of training portions of subtitles, a plurality of training quotes, and a plurality of training relationships that indicate associations between individual ones of the plurality of training portions of subtitles and individual ones of the plurality of training quotes, wherein mapping the quote further comprises:
inputting, into the trained ML model, the transcript including the matching transcript segment;
determining, by the trained ML model and via a fuzzy matching algorithm, the media content segment associated with the subtitle and the audible utterance; and
outputting, by the trained ML model, the media content segment.

15. The system of claim 10, wherein causing the video to be output further comprises:
determining at least one of a first viewing history associated with a user associated with the user request or a plurality of second viewing histories associated with corresponding other users;
determining a likelihood of the media content segment being viewed by the user, based at least in part on the at least one of the first viewing history or the plurality of second viewing histories; and
causing the video associated with the media content segment to be output by the external device, based at least in part on the likelihood of the media content segment being viewed by the user.

16. A method comprising:
causing a media file including media content to be stored in a database;
determining first individual ones of a plurality of dialog segments associated with corresponding segments of media content in the media file;
determining second individual ones of a plurality of transcript segments of a transcript associated with the corresponding segments of the media file;
mapping, by a machine learning (ML) model, a third-party quote to a media content segment of the media content that corresponds to one of the dialog segments matching the third-party quote and one of the transcript segments matching the third-party quote, a subtitle in the matching transcript segment including at least one first mappable element that is different from at least one corresponding mappable element of the third-party quote, the at least one first mappable element including one or more of a first word, a first phrase, a first language, a first spelling, a first pronunciation, or a first punctuation, an audible utterance in the matching dialog segment having at least one second mappable element that is different from the at least one corresponding mappable element of the third-party quote, the at least one second mappable element including one or more of a second word, a second phrase, a second language, a second spelling, a second pronunciation, or a second punctuation;
receiving, based at least in part on user input provided via an external device, a user request to display the media content segment; and causing, based at least in part on the user request, a video associated with the media content segment to be output by the external device.

17. The method of claim 16, further comprising:
determining a start time and an end time associated with the matching transcript segment; and
determining, by text parsing of the transcript and based at least in part on the start time and the end time, the media content segment.

18. The method of claim 16, wherein receiving the user request to display the media content segment further comprises:
causing an identifier associated with the media content segment to be output by the external device; and
receiving the user request to display the media content segment, the user request being transmitted by the external device based at least in part on user selection of the identifier provided via the external device.

19. The method of claim 16, wherein the ML model is trained, as a trained ML model, by inputting training data to the ML model, the training data including a plurality of training portions of subtitles, a plurality of training quotes, and a plurality of training relationships that indicate associations between individual ones of the plurality of training portions of subtitles and individual ones of the plurality of training quotes,
wherein mapping the quote further comprises:
inputting, into the trained ML model, the transcript;
determining, by the trained ML model and via a fuzzy matching algorithm, the media content segment associated with the subtitle and the audible utterance t; and
outputting, by the trained ML model, the media content segment.

20. The method of claim 16, further comprising:
causing at least one of a survey screen, a scan screen, or a browse screen to be output by the external device associated with a user, the survey screen being utilizable to at least one of request performance of, or share, a second media content segment, the second media content segment being sharable by the external device, to at least one other user, the scan screen being utilizable to at least one of scan, or request performance of third media content segment, the third media content segment having not been previously presented to the user, the browse screen being utilizable to at least one of browse, or request performance of a fourth media content segment, the fourth media content segment having been previously presented to the user; and
causing the at least one of the second media content segment, the third media content segment, or the fourth media content segment to be output by the external device, based at least in part on second user input provided via a user interface of the external device.

* * * * *